(12) United States Patent
Varma

(10) Patent No.: US 6,336,134 B1
(45) Date of Patent: Jan. 1, 2002

(54) DYNAMIC CLIENTS, DYNAMIC PARTITIONS, LOCKING, AND MIGRATION CAPABILITY FOR DISTRIBUTED SERVER FOR REAL-TIME COLLABORATION

(75) Inventor: Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/476,445

(22) Filed: Dec. 30, 1999

Related U.S. Application Data

(63) Continuation of application No. 09/241,991, filed on Feb. 2, 1999.

(51) Int. Cl.[7] .............................................. G06F 15/14
(52) U.S. Cl. ....................... 709/205; 709/201; 709/203; 709/204; 709/105; 709/243; 709/106; 345/326
(58) Field of Search ................................. 709/205, 201, 709/203, 204, 105, 106, 243; 345/326

(56) References Cited

U.S. PATENT DOCUMENTS

| | | | | |
|---|---|---|---|---|
| 5,459,865 A | * | 10/1995 | Heninger et al. | 709/108 |
| 5,583,993 A | * | 12/1996 | Foster et al. | 709/205 |
| 5,617,539 A | * | 4/1997 | Ludwig et al. | 709/205 |
| 5,844,553 A | * | 12/1998 | Hao et al. | 345/329 |
| 5,861,883 A | * | 1/1999 | Cuomo et al. | 345/326 |
| 5,862,330 A | * | 1/1999 | Anupam et al. | 709/204 |
| 5,887,170 A | * | 3/1999 | Ansberry et al. | 704/266 |
| 6,067,566 A | * | 5/2000 | Moline | 709/219 |
| 6,078,948 A | * | 6/2000 | Podgorny et al. | 709/204 |
| 6,081,291 A | * | 6/2000 | Ludwig, Jr. | 348/16 |
| 6,151,621 A | * | 11/2000 | Colyer et al. | 709/204 |
| 6,161,146 A | * | 12/2000 | Kley et al. | 709/248 |

* cited by examiner

Primary Examiner—Ayaz Sheikh
Assistant Examiner—Frantz B. Jean
(74) Attorney, Agent, or Firm—McGuireWoods, LLP; Stephen C. Kaufman

(57) ABSTRACT

A method for building a locking, migration, dynamic clients, and dynamic partitions capable distributed server for a real-time collaboration session supports the synchronous creation and deletion of partitions by clients as well as the addition and withdrawal of clients during a current collaboration session. The method is based on history servers for providing a history of modifications so that a newly-added client can compute the current state of a shared workspace. The history servers cache and granularize intermediate modification sequences so that computation space and time are reduced. The method supports migrating partition server(s), history server(s), a creation/deletion server, and a collaboration server to different machines. Partition(s) can be dynamically locked and unlocked and, in an extension of this procedure, creation and deletion of partition(s) can be pre-announced and supported. Advanced dynamic-partitioning activities like splitting a partition, merging partitions, shifting data from partition to partition are carried out naturally by locking the concerned partitions during the process of execution.

39 Claims, 18 Drawing Sheets

DYNAMIC CLIENTS, DYNAMIC PARTITIONS, LOCKING, AND MIGRATION CAPABILITY FOR DISTRIBUTED SERVER FOR REAL-TIME COLLABORATION

CROSS REFERENCE TO RELATED APPLICATION

The subject matter of this application is related to co-pending patent application Ser. No. 09/241,991 filed Feb. 2, 1999, by Pradeep Varma and Suresh Kumar for "Distributed Server for Real-Time Collaboration", which is assigned to a common assignee herewith. The disclosure of application Ser. No. 09/241,991 is incorporated herein by reference.

BACKGROUND OF THE INVENTION

1. Field of the Invention

The present invention generally relates to collaboration systems implemented on networked computers and, more particularly, to a method for building a locking, migration, dynamic clients, and dynamic partitions capable distributed server for a real-time collaboration session.

2. Background Description

Software for collaborative work, i.e., work involving many users and/or agents falls into two categories of use. One is termed asynchronous collaboration and the other, synchronous collaboration. Examples of software for asynchronous collaboration are groupware such as Lotus Notes and Microsoft Exchange. These along with other examples, such as discussion groups where data is changed batchwise, have the characteristic that neither do they require, nor do they particularly cater to the concurrent presence of many users and agents in the work environment. Work environment can include all users and agents that use computers that are connected to each other by networks such as Internet or intranets.

In contrast to software for asynchronous collaboration, software for synchronous collaboration is designed to cater to concurrent users and agents. It includes collaboration tools such as chat, concurrent whiteboards and the more sophisticated SameTime environment. These tools provide for real-time interaction among groups using the same shared workspace. Whatever be the workspace—document, spreadsheet, Computer Assisted Design (CAD) drawing, etc.—it can be seen and modified by the collaborators, simultaneously. Modifications to the workspace are made available to all group members, immediately and synchronously.

Synchrony in multiple updates made by collaboration participants has to be ensured by the underlying synchronous collaboration implementation. One of the common ways by which this is done currently is by the inclusion of a centralized server. A centralized server is a software process running on one host machine(a hardware computer) that introduces a serialization order among multiple modifications. Thus multiple, simultaneous updates to a shared workspace are communicated to the server which converts them into a sequential stream of updates to the workspace. The stream of updates is then reflected back to all participants, each of whom is assumed to be running a software process, a client, in order to interact with the workspace. Each participant or client thus sees the shared workspace develop in an identical manner—starting from the same initial state and changing under the same stream of updates—as any other participant or client of the collaboration. This method of streaming updates has many parameters. Each parameter can lead to a different behavior of collaboration at the user level.

Examples of parameters are: What is a modification? Is it a sequence of user-level operations and/or some translation of the same? Is it the complete, changed workspace itself? Is it an object difference—changed workspace minus unchanged workspace? What is the role of history of serialization in serialization itself? Is there any role? Can users explicitly lock out other users while making changes to the shared workspace? Answers to each of these questions can affect what the collaboration implementation means to its users, or in other words be a different definition of synchronous collaboration. Yet what all of these implementations have in common is their dependence on one server process to make serialization decisions for them.

As collaboration needs scale up—number of clients changing the workspace and needing synchronous views of the workspace goes up—the single server process running on a single machine and the communication network bringing about communication between the server and the clients can become severely loaded with computation and communication requirements. Indeed since the architecture of the collaboration implementation is such that it focuses all communication to one point in the communication network, namely the server's machine, it leads to the development of an unbalanced load on the communication network. It is possible that the communication network cannot effectively service the "hot spot" of communication, viz., the server's machine, despite being relatively lightly loaded in other parts of network or on the average. The result can be unacceptable delays and degradation in performance from the perspective of collaboration participants.

The invention disclosed in application Ser. No. 09/241,991 addresses the above issue by breaking the notion of one, centralized, software, server process into multiple, independently-communicating, asynchronous, independent, distributed software processes. Multiple software processes make up a distributed server, as shown in FIG. 2 of application Ser. No. 09/241,991. A distributed server is capable of being distributed and executed upon multiple heterogeneous hardware/software platforms that comprise the network and front ends participating in a collaboration session. The distributed server requires a partitioning of the shared workspace to be available in order to be applicable. The multiple software processes of the distributed server can be distributed to different machines and can be run simultaneously on the different machines. Thus, the distributed sever architecture can avoid focusing all communication to one point in the communication network, and diffuse away the "hot spot" of the centralized server into different parts of the network.

The distributed server in application Ser. No. 09/241,991 does not support migration of its processes, does not support locking of partitions by a client for exclusive use, and is limited to a static definition of workspace partitions and collaboration clients. In other words, in the distributed server of application Ser. No. 09/241,991, no new partitions can be created in an ongoing collaboration session, no old partitions can be deleted at run-time, no client can leave an ongoing collaboration session, and no client can join or rejoin an ongoing collaboration session. All of these limitations are addressed by this invention whereby the distributed server of application Ser. No. 09/241,991 is extended to become capable of fully handling dynamic clients, dynamic workspace partitions, locking and migration of distributed server processes while retaining the capability of fully handling static clients and static workspace partitions. As described in this disclosure, if the partitioning made available to a distributed server is dynamic, then processes corresponding to dynamic partitions can be started/ended/converted dynamically. In a collaboration session with dynamic clients, any client can leave or join the collaboration session at any time provided that the session has at least one client present at any time. The one client can be a different client at different times - in other words, one client can pass the "baton" to another; however, at any time, there has to be at least one client present in a collaboration session. This is a natural requirement for a collaboration session, since at least one person/client has to be present in order for even a rudimentary form of the session to take place.

SUMMARY OF THE INVENTION

It is therefore an object of the present invention to provide a method for building a locking, migration, dynamic clients, and dynamic partitions capable distributed server for a real-time collaboration session.

In order to take into account the changing nature of the communication network, wherein machines can be added, loaded, and removed dynamically, the processes of the distributed server can be migrated from machine to machine, dynamically. Indeed, the distributed server processes can avoid dedicated server hosting machines by residing and running solely on the machines hosting the client processes. In this case, the distributed server processes can migrate as and when new client machines are added or removed. The extended distributed server supports locking a partition by a client whereby the client with a lock can modify the locked partition until the client releases the lock.

According to the invention, there is provided a method for building a distributed server capable of handling locking, migration, dynamic clients, and dynamic partitions for a real-time collaboration session. The method includes: (i) a method by which a collaboration front end or client can synchronously create some new partitions; (ii) a method by which a client can synchronously delete some existing partitions; (iii) a method by which a client can synchronously get permission for creating or deleting partitions; (iv) an optional method based on optional, application-supplied creation/deletion server that is an alternative for the method for getting permissions; (v) a method based on history servers for providing a history of modifications so that a newly-added client can compute the current state of a shared workspace; (vi) caching or granularizing of intermediate modification sequences by the aforesaid history servers so that computation space and time are reduced; (vii) a method each for migrating partition server(s), history server(s), a creation/deletion server, and a collaboration server; (viii) a method for locking partition(s) and unlocking partition(s) whereby partition servers can handle lock and unlock operations; (ix) an extension of the preceding method of locking and unlocking partition(s) to accept pre-announced creation and deletion of partition(s); and (x) a method for carrying out advanced dynamic-partitioning activities like splitting a partition, merging partitions, shifting data from partition to partition—these activities are carried out naturally by locking the concerned partitions during the process of execution.

With respect to the distributed server in application Ser. No. 09/241,991, these methods preserve: (a) generality—different definitions of a modification continue to be supported along with additional support for a locking capability; (b) extensibility—simple, comprehensive and easy-to-implement inter-partition synchronisation is provided; (c) generality for partition hierarchies and groups, wherein in addition to the capabilities in the distributed server disclosed in application Ser. No. 09/241,991, simultaneous or incremental creation or deletion, of any group of new or existing partitions is also supported (as applicable). In comparison to the centralized server and the distributed server disclosed in application Ser. No. 09/241,991, these methods further improve interoperability across heterogeneous software/hardware platforms by (a) extending the functionality of distributed-server-based real-time collaboration to dynamic partitions and dynamic clients, and (b) allowing the distributed server processes to migrate and dynamically adapt to changing network (including frontends), and collaboration conditions, which in turn obviates the need for special support for immobile processes from the (hardware/software platforms/servers comprising the) network in the face of commonplace faults, transients, load relief, and balanced/unbalanced development of network load.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
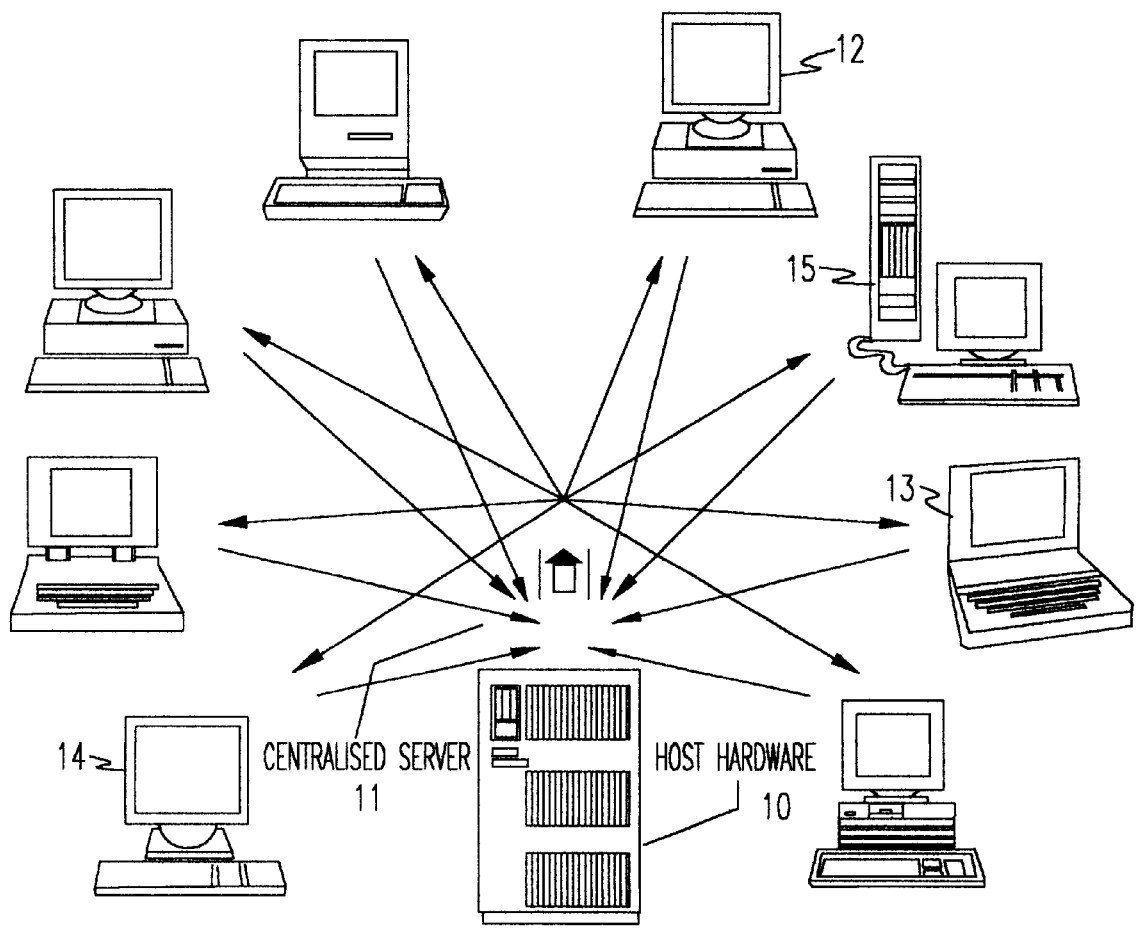
FIG. 1 is a schematic diagram showing a typical centralized server known in the prior art.

Referring now to the drawings, and more particularly to FIG. 1, there is shown a simple centralized server 11 running on a host hardware system 10. The server is comprised of a First In, First Out (FIFO) queue structure in which modifications coming from various clients are entered. These clients are collaboration software frontends which interact with collaboration participants. The clients may be running on desk top computers, such as computer 12, laptop computers, such as computer 13, network computers, such as computer 14, or work stations, such as computer 15. A client sends modifications to the server on a channel that is itself a FIFO structure. The server 11 picks a modification from one of the outputs of channels coming from clients and enters it into its FIFO queue. The order in which modifications get entered in the server's queue forms the order of serialization of the modifications. The output of the server's FIFO queue is broadcast to all clients over channels that are FIFO structures. Thus, the architecture of a simple centralized server is channel-order preserving—the order in which a client puts modifications on its channel to the centralized server is preserved in the serialized stream of modifications sent back to the client by the server.

In the invention disclosed in application Ser. No. 09/241,991, the distributed server is based on the observation that if a workspace can be broken up into disjoint partitions which can be modified independently of each other, then any concurrent modifications to the partitions need not be sent to one centralized server for the sake of serializing them. Each partition can be assigned an independent server, and only modifications pertaining to that partition need to be serialized by its assigned server. Work spaces can be partitioned in many different ways. Examples are paragraphwise for a text document, tableswise for a spreadsheet application, and objectwise for a three-dimensional (3D) application showing 3D objects. In general, the partitioning of a workspace can be static, or in other words, it does not change during a collaboration session, or it can be dynamic, which implies that it can change during a collaboration session. If the partitioning is static only, then in the examples above, creation and deletion of paragraphs, tables and objects cannot happen during a collaboration session. The individual paragraphs, tables, objects can be modified, emptied, expanded, however, no whole paragraph etc. can be deleted or created as such. Creation and deletion of these entities requires that the partitioning of the workspace be dynamic. The distributed server in application Ser. No. 09/241,991 caters to static partitionings only.

Figure 2:
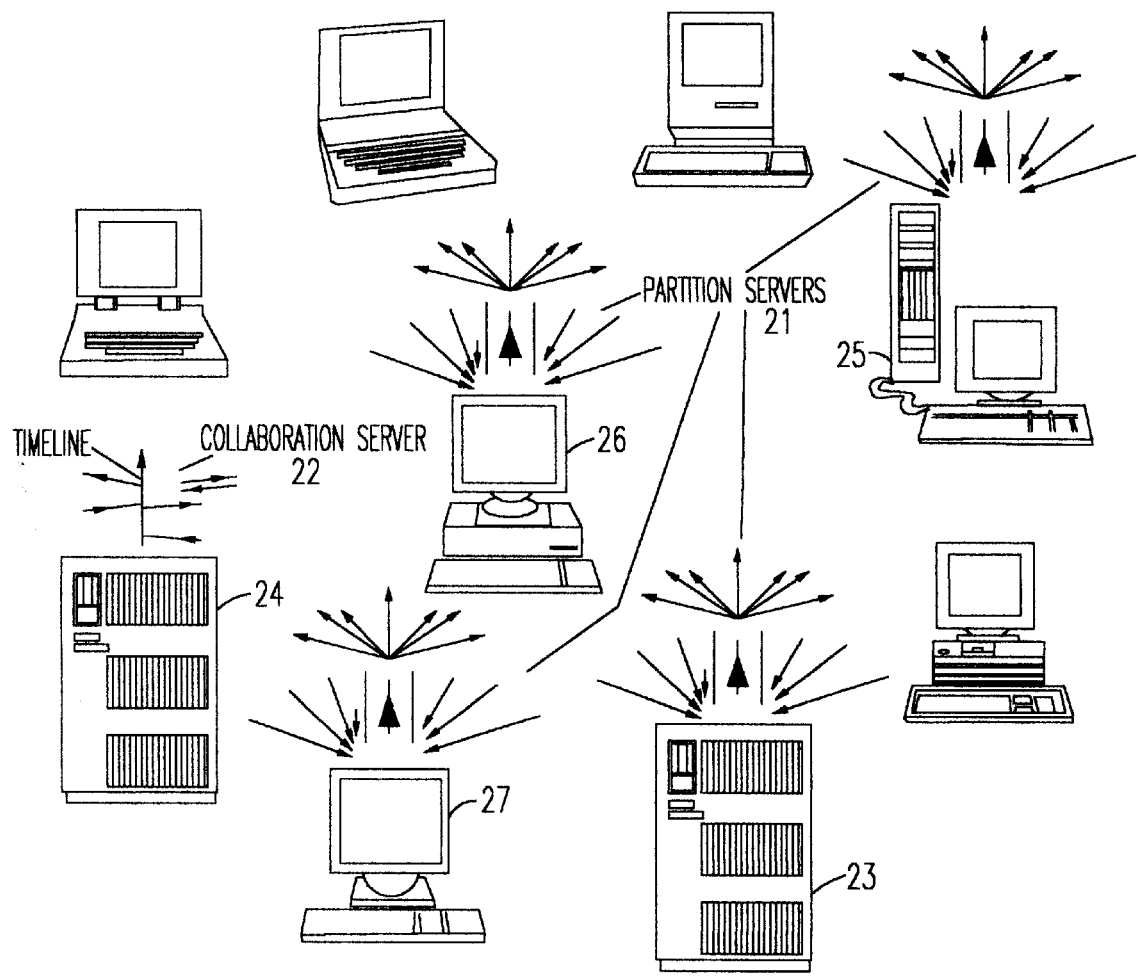
FIG. 2 is a schematic diagram showing the distributed server disclosed in patent application Ser. No. 09/241,991.

FIG. 2 illustrates an example of a distributed server according to the invention disclosed in application Ser. No. 09/241,991. A distributed server includes a server 21 for each partition, i.e., partition servers, and one collaboration server 22 that provides support for compound modifications. The distributed server includes two or more (one collaboration server, and at least one partition server) independently-communicating, asynchronous, independent (i.e., no share shared memory, data, variables) software processes that can run simultaneously on one or more heterogeneous or homogeneous, interconnected computers and/or computing elements, here represented by host hardware systems 23 and 24, work station 25, desk top computer 26, and network computer 27.

The extended distributed server of the present invention supports both static partitionings and dynamic partitionings. The support for dynamic partitionings provided by the extended distributed server includes not just creation and deletion of partitions, but also their merging and splitting. So in the partition examples described above, the dynamic-partitioning activities of merging and splitting of paragraphs, tables, and objects can be done besides their dynamic, isolated creation and deletion using the extended distributed server.

The partitioning of a workspace needs to be explicitly provided to the distributed server in order for it to provide a distributed serialization service for the partitions. The partitioning can be user supplied, in which case participant (s) including their assistant(s) explicitly deal with partitions and partition changes for collaborative sessions. Otherwise, the partitioning can be application supplied, in which case the partitioning is generated and maintained automatically by the application software associated with the shared workspace. Examples of this are applications that translate their work spaces into NSTP (Notification Service Transport Protocol) partitions such as places. For these applications, and for all other cases where workspace partitioning is made available, a distributed server can be plugged in as the serializing backend. So for example, synchrony in each NSTP partition can be maintained by the plugged-in distributed server.

Partitionings provided to the distributed server can be hierarchical and/or grouped in nature. So for example, partitions can contain sub-partitions within them as in the case of hierarchical tables and 3D objects containing other 3D objects. Partitions and sub-partitions are treated simply as partitions by the distributed server. The distributed server presented here can support dynamically-created and dynamically-deleted hierarchical/grouped partitions. A dynamically-created hierarchical/grouped partition can involve the simultaneous creation of multiple (sub) partitions, or the hierarchical/grouped partition can be built incrementally. Both of these cases are catered to by the distributed server. The corresponding cases for the dynamic deletion of a hierarchical/grouped partition are also supported by the distributed server.

Here also, as in the invention disclosed in application Ser. No. 09/241,991, in order to use the distributed server, each work space modification request (e.g., a partition creation request) has to identify which partition(s) it can possibly affect, and therefore, which (remaining) partitions can remain oblivious of and therefore out of synchrony with the modification request. If a multiplicity of partitions is identified for a modification request, then the modification is treated as a compound modification over the identified partitions. If only one partition is identified as affected by a modification request, then the modification may be treated as an ordinary modification over the identified partition, although a compound modification over one partition can also be used. For the identified partition(s), the given modification will be synchronized with respect to each of them by the distributed server. This means that for any partition that is one of the identified partitions, the position of the given modification in the sequence of modifications on the identified partition as seen by any collaboration client (that participates in the collaboration throughout the modification sequences) is the same. Furthermore, for every client, it is guaranteed that when the given modification is seen (i.e., processed) by the client, all modifications preceding the given modification on each of the identified partitions would have been processed by the client. Since each partition is either already there with an identical value for each client at the start of collaboration, or it gets created dynamically, wherein the creation is itself defined as a modification on the partition, processing of just the given modification implies that the state of the identified partitions becomes the same for every client. In other words, when clients process a given modification over one or more partitions, their states for the partitions get synchronized to be the same. Since this is true for all modifications of the workspace, processing of the workspace by its clients proceeds in a synchronous manner when the distributed server is used.

Since each modification request has to identify all partitions that it can possibly affect, an easy answer for a modification request is to identify all partitions. This would lead to each modification being synchronized over the entire workspace state. This is neither necessary nor efficient. The closer the identification of possibly-affected partitions is to actually-affected partitions, the lesser is the amount of serialization effort required from the distributed server, and the better is the utilization of the distributed server in its serialization purpose.

Figure 3:
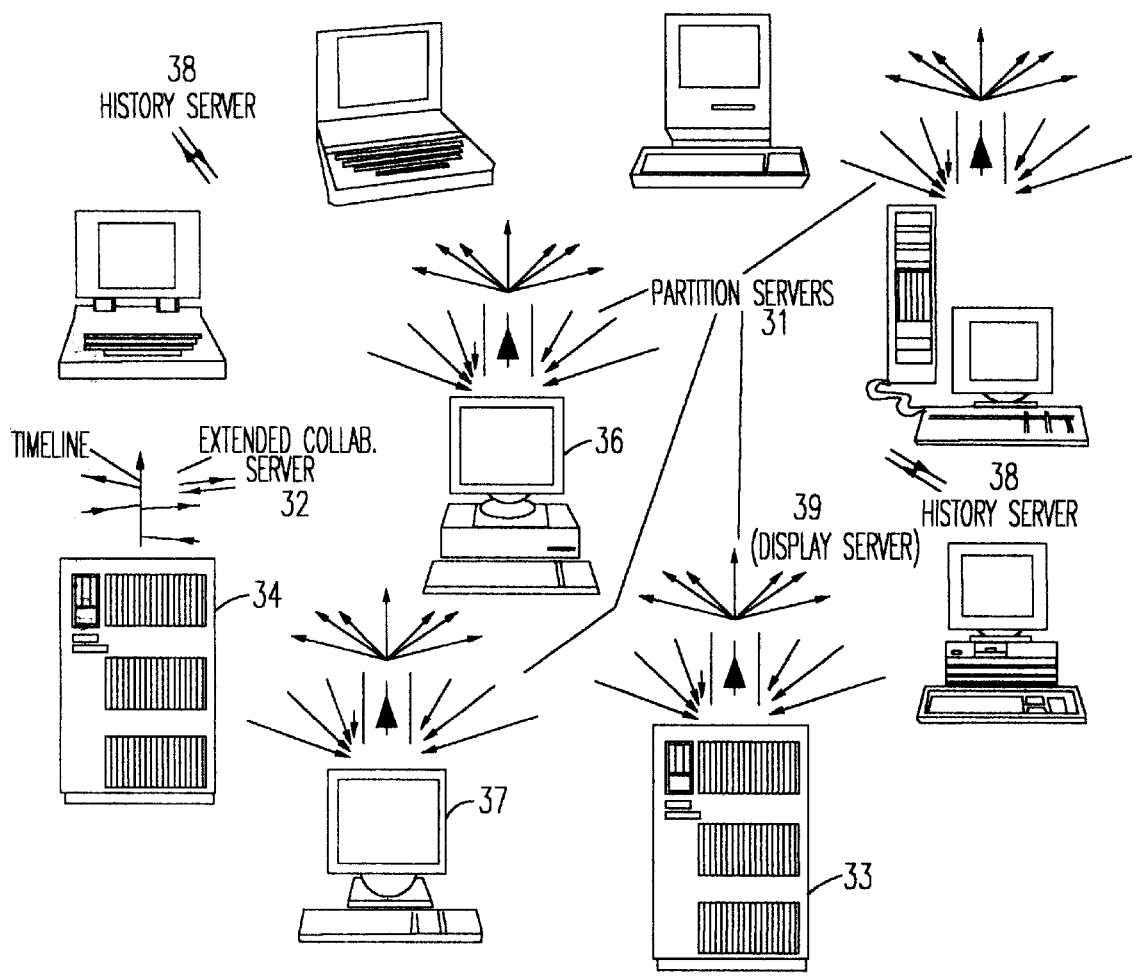
FIG. 3 is a schematic diagram showing the extended distributed server of the present invention.

The structure of the extended distributed server according to the present invention is illustrated in FIG. 3. In its basic form as given in application Ser. No. 09/241,991, the architecture of the distributed server comprises of a server for each partition, i.e., partition servers 31 (there is no display server), and one collaboration server 32 that provides support for various activities including compound modifications. The extended distributed server of this invention includes two or more (one extended collaboration server, and at least one partition server) independently-communicating, asynchronous, independent (i.e., no share shared memory, data, variables) software processes that can run simultaneously on one or more heterogeneous or homogeneous, interconnected computers and/or computing elements, here represented by host hardware systems 33 and 34, work station 35, desk top computer 36, and network computer 37. This architecture is sufficient for the static partitionings and static clients supported by the invention disclosed in application Ser. No. 09/241,991. For the dynamic partitionings and dynamic clients supported here, the architecture expands to include a notion of history servers 38. In the context of dynamic partitionings, the architecture can interface with one optional creation/deletion server that might be provided to the distributed server for the sake of efficiency. History servers are needed only if dynamic addition of clients requires the re-enaction of the history of modifications on a starting workspace in order to bring a newly-added client up to speed with the state of the workspace in a progressing collaboration session (see further the comments at the end of the disclosure). A history server arises from a deleted partition server and serves the purpose of being a history of modifications repository for newly-added clients. As in the invention disclosed in application Ser. No. 09/241,991, here also the basic structure of a partition server is similar to that of a simple centralized server. It comprises of a FIFO queue to which each client sends modifications on a FIFO channel, and from which each client receives serialized modifications on a FIFO channel.

In order to make the basic partition server compatible with distributed server functionalities such as migration and dynamic client addition and deletion discussed in detail later, the structure of the partition server is extended as follows. For migration, each partition server is extended by one channel coming into the server from the collaboration server, so as to enable the collaboration server to send a migration-related modification to the partition server; also for migration, when a partition server is migrated, its migrated copy forms temporary re-routing channels to the un-migrated server to allow modifications sent to the un-migrated server to be passed on to the migrated copy for processing till for each temporary channel, a normal channel of the migrated copy is able to take over the job fully and without any loss of continuity; for dynamic addition of clients using a history-re-enacting mechanism, each partition server is extended by a history-recording mechanism (say an expandable FIFO buffer) by which entries made into the FIFO queue are remembered along with the order in which they are entered into the queue. The order of entry of modifications into the server's queue forms the order of serialization of modifications on the partition.

As discussed in this paragraph, compound modifications and ordinary modifications in the invention disclosed in application Ser. No. 09/241,991 and here are the same. The order of entry of modifications into the server's queue has to be carried out with some reasonable amount of fairness. For instance, the server cannot arbitrarily just pick modifications from one channel and block out other channels forever. Just as in the case of the simple centralized server, a partition server is also channel-order preserving. Treatment of an ordinary modification by a partition server parallels treatment of a modification by the centralized server. The modification is placed on the channel to the partition server by a client. It later reaches the output of the channel and is eventually picked by the server and placed in its queue to be broadcast to all clients including the sending client. Treatment of modifications that are compound is unique to a distributed server. In order to send out a modification as a compound modification, the modification request has to find out for each of its identified partitions, the relative position of the compound modification among the sequence of modifications on the partition. To do this, the modification request has to contact the collaboration server which sends back the operation's relative position on each partition back to the modifying client. The notion of a relative position has got built into it an ordering relation on relative positions. For any relative position, it is possible to determine which relative positions precede it. If a relative position precedes another, then the latter position is said to succeed the former. Given the ordering relation, it is straightforward to determine between two distinct positions, which precedes or succeeds the other. Once the modification request has got the relative positions for its compound modification, it processes the compound modification for each identified partition by tagging the modification with the partition's relative position and placing the tagged modification on the channel to the partition's server. When a given tagged compound modification becomes available at the output of a channel to a partition server, the partition server is free to pick it provided the server has already picked and entered tagged compound modifications for all tags that precede the relative position tagging the given compound modification. If this is not the case, then the partition server lets the given modification stay at its channel output till all remaining preceding tagged modifications have been picked by the server from other channels. Thus, the channel of the given compound modification is blocked by the partition server till the server becomes free to pick the compound modification. The partition server thus enforces an ordering on the compound modifications received by it—a compound modification is broadcast by the server only if all its preceding compound modifications have already been broadcast by the server. No ordering is enforced between compound modifications and ordinary modifications, except for the requirement that the partition server pick modifications from different channels with some reasonable amount of fairness. Once fairness has been accounted for, if an ordinary modification is available at the output of a channel and a compound modification that can be picked next is available at the output of another channel, the partition server is free to pick any of them, thereby allowing any order between them. Thus, the stream of modifications broadcast by a partition server includes compound modifications ordered by their relative positions and ordinary modifications interleaved between the compound modifications. Modification requests are processed atomically by a client. Thus, the state visible to various client processes is either that preceding the execution of a given modification request, or it is the state in which the modification request has been fully carried out. A simple way of implementing atomicity for a modification request is to carry it out fully in one stretch of computation, making other requests wait till the processing of the request is over fully. Thus, for a compound modification, getting relative positions from the collaboration server and placing tagged modifications on outgoing channels for identified partitions occurs in one stretch of computation. A sequential implementation of atomicity of modifications is not necessary. So for example, an implementation can be such that it allows ordinary modifications to be placed on outgoing channels for identified partitions of a compound modification for which the client is in the process of getting relative positions from the collaboration server. In this case, it is straightforward to find a linearization of the modifications so that each modification is atomic. The introduction of concurrency has to ensure atomicity of requests is not compromised. So for example, an implementation should not allow two compound modifications to be processed concurrently so that the order in which they get relative positions on the same partitions is the reverse of the order in which they place tagged modifications on channels for the partitions. If this is allowed, no linearization of the modifications which allows the two compound modifications to remain atomic will exist. In this case, the system can deadlock.

In order to carry out its activities such as providing relative positions for compound modifications, the collaboration server 32 maintains one time line of computation for sequencing its activities. Any activity carried out on the time line has a well-defined atomicity—it occupies one contiguous stretch of the time line and is not considered attempted unless it is fully carried out. Any portion of the time line can be occupied by at most one activity that is carried out on the time line. In other words, activities carried out on the time line are ordered sequentially with respect to each other.

One simple way of implementing the time line of computation is as a single thread of computation that takes as input a request that has to be carried out on the time line. The thread carries the request out fully before taking another request that has to be carried out on the time line. The thread waits in case no request that has to be carried out on the time line is available. It can be desirable for the collaboration server to remember highlights of activities carried out on the time line, in the order in which they were carried out. Any linear, expandable data structure can be used for the purpose.

In the rest of the disclosure that follows, events on the time line that are sought to be remembered are explicitly mentioned. Thus, all activities on the time line need not be remembered. Relative position on a partition is implemented as an integer counter for the partition with a well-known initial or starting value; e.g., zero. Thus, checking whether one relative position precedes another requires simply using the less than relation on integers. Other implementations of relative positions are possible; however, the one chosen suffices along with advantages of simplicity and efficiency. When a request for relative positions on some partitions arrives, the following activity is carried out by the collaboration server on its time line of computation. For each of the requested partitions, the current count of its counter is noted and the counter is incremented. After this activity, the collaboration server returns the noted count on each partition to the requesting client as the relative position on the partition. Besides providing support for basic activities such as compound modifications, the collaboration server provides support for distributed server fuictionalities such as dynamic partitioning support, migration, and dynamic addition and deletion of clients. For these functionalities, the collaboration server maintains and uses the following status structures at any time, which contain an approximation of the exact state of the collaboration session at the time: the set of clients that are currently participating in the collaboration session; the current set of partition servers (including their locations); the current set of history servers (including their locations); and the current location of the creation/deletion server, if present. These status structures either remain invariant, or are modified only by the collaboration server, on the time line of the collaboration server.

As discussed in this paragraph, the interface by which a client receives modifications from partition servers is the same in the invention disclosed in application Ser. No. 09/241,991 and here. A client sends modifications to partition servers and gets back serialised streams of modifications from the partition servers. Since ordinary modifications on different partitions are independent of each other, the client is free to interleave ordinary modifications from the serialized streams in any reasonably fair order in order to process the serialised modifications atomically, sequentially. Reasonable fairness rules out behaviour such as the client picking modifications from one stream alone, blocking out other streams forever, arbitrarily. The client has to pick from the output of each incoming channel carrying a stream in order to maintain the channel order on the stream. Compound modifications in different modification streams can be related to each other, and so cannot be treated independently in general. In order to process a compound modification over some identified partitions, the client has to wait for the compound modification to become available for each indentified partition, on the output of the incoming channel carrying the serialised stream for the partition. After the compound modification has become available on the incoming output for each identified partition, the modification has to be processed by the client in one atomic step for all identified partitions. This procedure ensures that when a compound modification over some partitions is processed, any modification over any of the same partitions that precedes the compound modification is processed before the processing of the compound modification. A client can thus process serialised modifications over incoming channels as follows, using a reasonably fair method for picking a modification in all of the following procedure: The client picks a modification from any one of the channel outputs. If it is an ordinary modification, the client processes it in one atomic step and then goes back to the channels to pick the next modification from any of the channel outputs. Somewhere along the way, the client picks a compound modification from a channel output. If the modification is compound over one partition alone, then the client processes it in one atomic step. Otherwise, the client cannot process the modification alone by itself. The client thus leaves the modification alone and goes on to other channels in order to pick and process modifications from them. In order to maintain channel order in the modification stream whose compound modification has been left alone, the client cannot pick modifications from that stream till its compound modification has been processed. Thus, the channel from which the compound modification had been picked is blocked out from the set of channels from which the client can pick and process modifications after putting the compound modification aside. After the client has processed some other modifications from channels of other partitions (possibly even zero such modifications), it will find itself handling the same compound modification that it had put aside, coming from the output of another channel corresponding to another one of the partitions from the set of identified partitions for the compound modification. The client has to put this modification aside also, block out its channel, and continue processing other channels till it has picked the compound modification for all of the identified partitions. When the client has picked the compound modification for the last of the identified partitions, then the client can process the compound modification over all the identified partitions in one atomic step and unblock their channels. The client can then go back to picking and processing modifications from channels as usual. It is possible for a client to be blocking out channels for separate compound modifications at one time. The modifications will get processed independently of each other following the procedure described above. Notice that in what is described above, the final serialised stream of workspace modifications can differ from client to client. This is because the procedure for converting serialised streams of modifications on workspace partitions into one stream of modifications on the workspace is not required to enforce the same behaviour for each client. However, on a partition-by-partition basis, the final serialised stream seen by any client is equivalent to the final serialised stream seen by any other client.

A real-time collaboration implementation is parameterised by decisions such as what a modification is. In the context of an unpartitioned workspace, a modification can be a sequence of user-level operations and/or some translation of the same. A modification can also be the complete, changed workspace itself, or it can be a workspace difference—changed workspace minus unchanged workspace. In the context of a partitioned workspace, the definition of a modification shifts to a partition-to-partition basis. So a modification is either operations on a workspace partition and/or their translation, a complete, changed workspace partition, or a workspace partition difference. When a modification is defined as a workspace partition difference, or a sequence of operations on a workspace partition and/or their translation, then the modification requires a context before it can be applied.

The context has to provide the unchanged partition upon which the application of the sequence of operations or partition difference can yield the changed partition. When a modification is defined as a complete, changed partition, then it carries the context of the modification with itself. This means that the modification by itself is sufficient to determine uniquely the changed partition, which in this case is trivially true, since the modification is itself the changed partition. Differences in the choice of the definition of a modification can lead to different behaviours of real-time collaboration at the user level. When a modification carries its context with itself, then it is always the case that collaboration participants see the shared workspace change and develop as per some series of intentions of the individual participants. On the other hand, when a modification does not carry its context with itself, then it is possible for the modifications to compose in some manner that is out of context of what the partcipants intended. For example, two participants attempting to delete the same word in a text document can send delete operations out at the same time. The result can well be the successful deletion of the target word along with an unintended deletion of the word preceding the target word in the text document. A shared workspace can thus develop unintended changes including even nonsensical and erroneous changes (run-time errors) during a collaboration session when the definition of modifications used does not require the carriage of modification context with individual modifications.

When a modification carries its context with itself, then collaboration participants can see the analogue of acoustic echos in real-time collaboration: A distant/low-bandwidth-linked participant can send out modifications that repeatedly set the shared workspace back to a state that is far behind what the other better-connected participants have developed it, so the participants are thus forced to deal with echos of the workspace coming back from the distant participant. A variant of carriage of context within modifications is a scheme in which instead of the full context, a context identification is carried within a modification. A modification thus no longer incurs the cost of the full carriage of a context.

In this scheme, the server (centralised server in the unpartitioned collaboration system case; in the case of the application of the extended distributed server presented herein, the relevant partition server) remembers the last modification it broadcast out to all clients as a serialised modification. The server passes a new modification onto its serialised output (broadcast stream) only if the modification has the last modification's identity as its context identification. The server rejects any modification carrying an older modification's identity as its context identification. Thus, this scheme uses the history of modifications on a workspace/workspace partition in allowing finther modifications on the workspace/workspace partition. This scheme does not suffer from the effect of echos like the simple full-context-carriage scheme.

A drawback of this history-based scheme is that a distant client can find itself blocked out from making modifications to a workspace partition/workspace because it is always outpaced by modifications from other clients. Such unfair treatment of distant clients can be ameliorated by the provision of a locking mechanism in the collaboration system. When a collaboration system provides a locking mechanism on a workspace or a workspace partition, then the collaboration system allows its clients some means to acquire and release a lock on the workspace or workspace partition. At any time, only one client can be holding a lock on the workspace/workspace partition.

When a client holds a lock on a workspace/workspace partition, then only that client can make modifications to that workspace/workspace partition. All other clients are blocked out from making modifications to the workspace/workspace partition during that time. A client holds a lock on a workspace/workspace partition from the time it successfully acquires a lock on the workspace/workspace partition and up to the time it releases the lock on the workspace/workspace partition. The extended distributed server presented herein is compatible with any of the definitions of a modification discussed above. It provides support for locking, which is useful independent of whether historybased serialization is used or not. The distributed server supports history-based serialization on a partition-to-partition basis. Ordinary modifications are serialized by partition servers on a history basis. Inter-partition modifications or compound modifications are treated as context insensitive by partition servers. Thus, compound modifications are kept independent of history-based serialization by partition servers. The sequencing of compound modifications among themselves follows the relative positions they are assigned by the collaboration server. The sequencing of ordinary modifications among themselves follows their history basis. The interleaving of the sequences of compound modifications and ordinary modifications is indeterminate.

Beyond the treatment above of the overall architecture of an extended distributed server is a detailed discussion of the handling of dynamic partitionings, dynamic addition and removal of clients, distributed server migration, and locking. This discussion is carried out in the rest of this invention disclosure. The shift to dynamic partitionings brings with itself the observation that it is possible for all partitions in a workspace to get deleted in a collaboration session. A collaboration participant who may have sought a compound modification on some of the undeleted workspace partition (s) concurrently may find itself getting back (no) relative positions on an empty list of partitions from the collaboration server as a result. In this case, the participant's client is free to drop the compound modification if the modification is not relevant in the context of deleted partitions. On the other hand, it can well be that a participant has issued a modification that is relevant even if there are no partitions present in the workspace. For example, a participant can issue a modification that affects the display controls of the work space. This modification may need to be serialized; however, there are no partition servers through which this can be done. To handle such situations, the notion of a special null partition, called a display partition is introduced. This is supported by the display server 39 in FIG. 3. A display partition is static. It cannot be created or deleted dynamically. Modifications can always be serialized through the display partition, independent of whether other partitions are present and/or also used for the purpose of serialization. If modifications reflecting changes to the shared display controls of collaboration participants require synchronization over the entire state of the workspace, then the modifications should be made compound over all partitions, including the display partition. What follows now, in the rest of this disclosure, is a detailed treatment of the new extensions concerning a distributed server.

Handling Dynamic Partitionings

Figure 4:
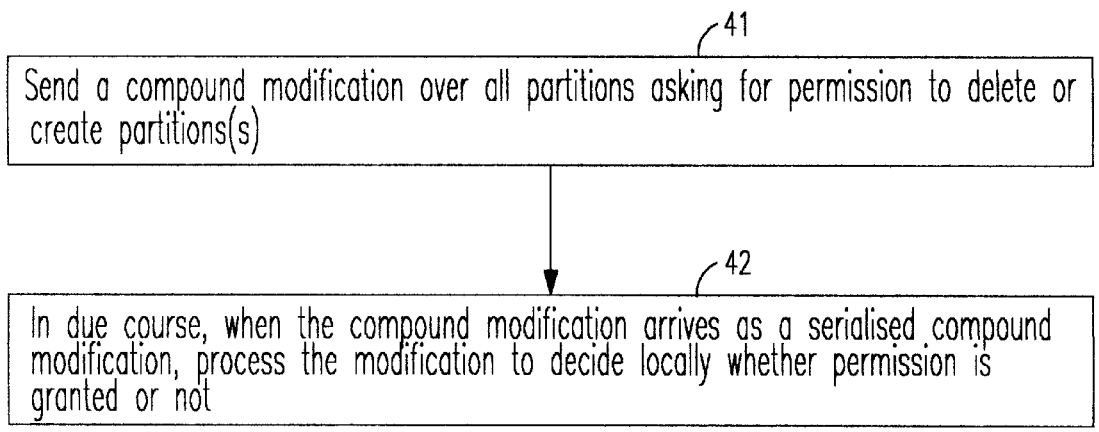
FIG. 4 is a flow diagram showing the steps followed by a client for getting permission for creating/deleting partitions.

The distributed server can be made a part of a real-time collaboration system in which dynamic partitions are used. In such a system, a client can request the creation of one or more new partitions at a time. A client can also request the deletion of one or more existing partitions at a time. The procedure is generally shown in FIG. 4 where, in function block 41, a client sends a compound modification over all partitions asking for permission to delete or create partition (s). In due course, when the compound modification arrives as a serialized compound modification, the modification is processed in function block 42 to decide locally whether permission is granted or not.

Since clients operate in concurrence on the shared workspace, it is possible for a multiplicity of them to propose the creation or deletion of partition(s). Before partition(s) can be actually created or deleted, the proposals for their creation or deletion have to be approved. Since the workspace is one shared entity, proposals to add or remove partitions from it have to be dealt with in some synchronized manner in order for decisions (such as approving at most one of many repeat requests) to be arrived at. In the extreme case, each creation/deletion decision can require synchronisation on the entire workspace state.

The machinery for such synchronization is provided by the distributed server via partition servers 31 (including display server 39), and the collaboration server 32 which provides support for compound modifications. Clients can use this machinery in order to decide and communicate on each proposal to create or delete partition(s). The machinery can provide some synchronized work space state to clients in the context of which the clients themselves can can evaluate a creation/deletion proposal.

The procedures for evaluating a creation/deletion proposal in the context of synchronized work space state are not a part of the distributed server. They are a part of the dynamic partitioning scheme that is present in the collaboration system independent of the distributed server. For example, in a restricted, single client system, work space state is trivially synchronized, and a proposal to create or delete partitions can be evaluated directly by the client without the use of any synchronisation machinery. This evaluation is independent of the distributed server machinery.

The distributed server comes into the picture only in the implementation of a creation/deletion decision that the client has arrived at. In the general, multiple client collaboration systems, clients have to use some synchronization machinery in order to use the proposal-evaluating procedures of their dynamic partitioning scheme. Such synchronization support can be distributed server provided. One example of such support that handles the extreme case of synchronization on entire work space state is generally shown in FIG. 4 and is described in detail later in this section.

Another approach, whose motivation includes efficiency, to deciding about creation/deletion proposals is to separate out the decision-making mechanism (including proposal-evaluating partitioning procedures) from client processes into one separate creation/deletion server process. Clients have to communicate with the creation/deletion server to get approval (or disapproval) of their creation/deletion proposals. Since the creation/deletion server is one process, it can maintain all the necessary synchronized state locally to evaluate creation/deletion proposals. The necessary state can be a skeleton-like representation of workspace partitions, resulting in a lightweight nature of the creation/deletion server process.

In order to have a simple non-backtracking (across concurrent processes) means of evaluating creation/deletion proposals, clients are required to implement any proposal that they get approval for. Thus, once the creation/deletion server approves of a change to workspace partitioning, it can assume that the change will be implemented, and that it will not be required to go back and undo any (chain of) decision (s). The order in which the creation/deletion server approves of partitioning change requests is not required to be the same as the order in which the approved requests have to be implemented.

When a given client's request for creation/deletion is disapproved by the creation/deletion server, it can well be due to some other decisions that the server has approved of before the given client's request. The client is free to persist in requesting partitioning changes, especially reworded partitioning changes, after the effects (implementation) of other partitioning changes have percolated down to it. Since a separate creation/deletion server encompasses procedures that are related to the dynamic partitioning scheme, the provision of the creation/deletion server is not made a part of-the distributed server. If a collaboration system provides an explicit creation/deletion server designed for use with the distributed server, then it is recommended that procedures for migration of the creation/deletion server described in a later section be built into the server, so that the creation/deletion server is in full conformity with the design principles of the distributed server.

After a client gets a proposal for creation of partition(s) approved, the client communicates with the collaboration server 32 with a request for creation of the partition(s). The collaboration server 32 processes a creation request as the following activity on its time line of computation: for each of the partition(s), a machine that will host the associated partition server 31 is assigned, and the machine is contacted by the collaboration server 32 with a request to build the partition server 31 for the partition, given the set of current clients (taken from status structure) and (the current location of the) collaboration server 32 (for the incoming channel from the collaboration server); the collaboration server 32 then waits to hear back from each of the machines contacted that each partition server 31 being built on the machine is "information"; the collaboration server 32 next creates a relative position service for each of the new partition(s) and adds the new partition server(s) 31 to the (status structure) set of current partition servers; the collaboration server 32 then notes the current relative position for each of the partitions on which a compound modification announcing the initial value of the new partition(s) has to be sent out (minimally, the partitions include the new partitions, each of whose current relative position is the well-known initial position, and the display partition); for each of the partitions whose relative position has been noted, the relative position counter is incremented to point to the next relative position. After this activity, the collaboration server 32 sends the noted relative positions to the client which requested the creation of partition(s) in order for the client to be able to send out a compound modification announcing the initial value of the new partition(s). Upon receipt of compound modification positions from the collaboration server 32, the next step for the creation-requesting client is to send out the initial value for the new partition(s) as a compound modification on work space partitions.

The construction of the new partition server(s) can be happening in concurrence during the time the creation-requesting client becomes ready to send out the initial-value-announcing compound modification. There can also be other compound modifications (from other clients) on the new partitions(s) that become ready to be sent out in concurrence with the initial-value announcing modification. Ordinary modifications on the new partition(s) do not become available for sending out at a client till after the client has received and processed the serialized initial-value-announcing compound modification from the partition servers. Since the initial-value-announcing compound modification, other compound modifications, and the construction of the new partition server(s) can occur in concurrence, it is required that all compound modifications (at least the part being sent to a partition server under construction) wait till the channels of the new partition server(s) have been formed—say each of the partition server(s) does the following. First it forms all of its portion of channels. Then it contacts all current clients and requires them to form their portions of channels coming from the partition server before going to the next step. In the next and final step, the server sends a message to all current clients and collaboration server letting them form their portions of the channels to the partition server. In this implementation, a client can be allowed to send a modification to a partition server as soon as the client has succeeded in forming its portion of the channel going to the partition server. The new partition(s) become available for independent manipulation through a client after the compound modification announcing the partition(s)' initial value is received and processed by the client.

Figure 5:
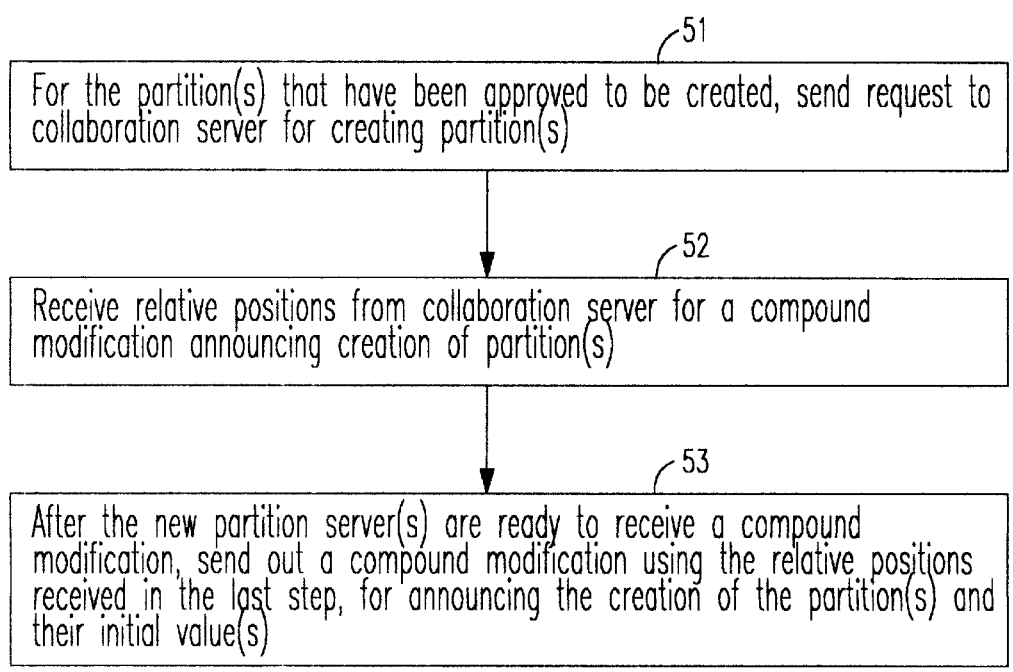
FIG. 5 is a flow diagram showing the procedure followed by a client for creating some new partition(s)
Figure 6:
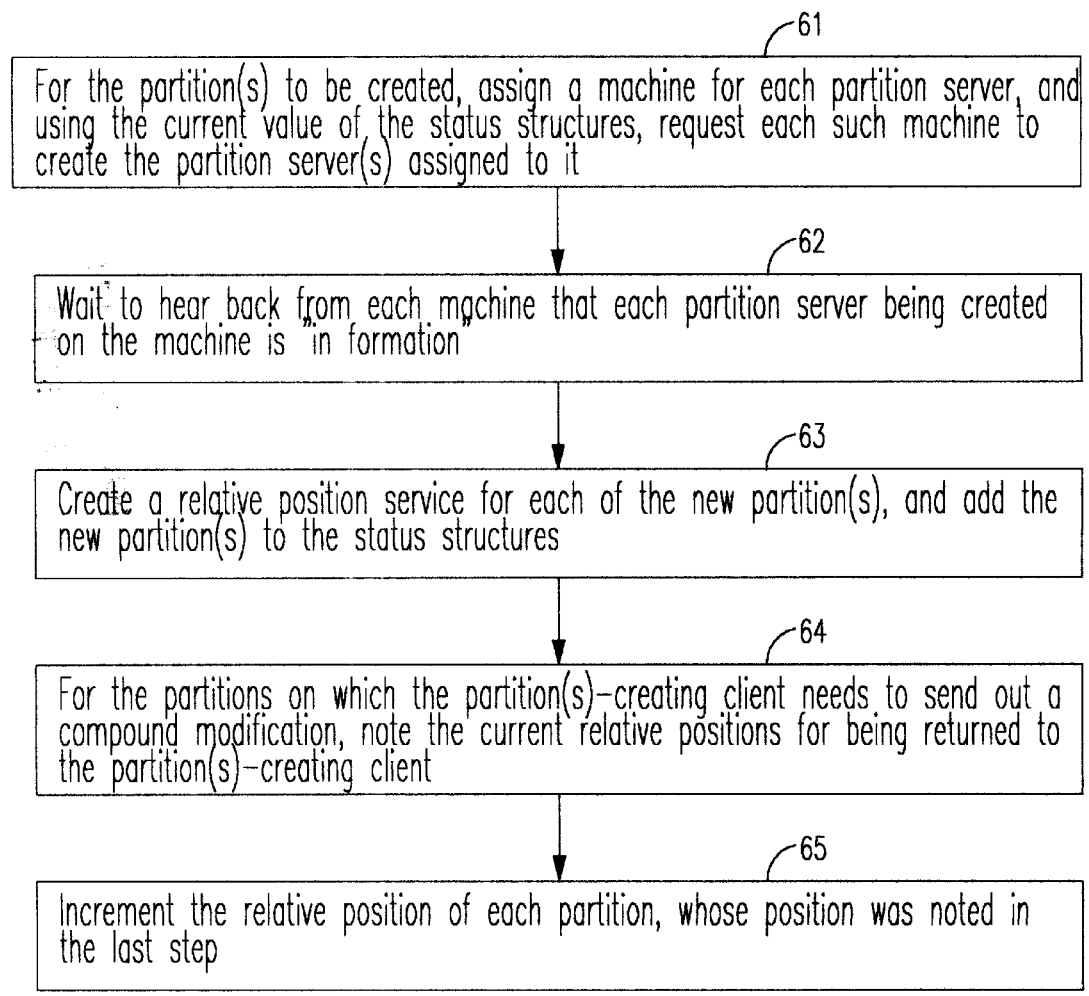
FIG. 6 is a flow diagram showing the activity carried out by the collaboration server on its time line for a partition (s)-creation request.

The procedure and time line activity followed for creating new partition(s) is illustrated in FIGS. 5 and 6. Referring first to FIG. 5, the client sends a request to the collaboration server for creating partition(s) in function block 51. The client receives from the collaboration server relative positions for a compound modification announcing creation of the requested partition(s) in function block 52. After the new partition server(s) are ready to receive a compound modification, the client sends out a compound modification using the relative positions received in block 52 for announcing the creation of the partition(s) and their initial value(s) in function block 53.

The activity carried out by the collaboration server 32 on its time line for a partition(s)-creation request from a client is shown in FIG. 6. For the partition(s) to be created, a machine is assigned for each partition server and, using the current value of the status structures, each such machine is requested to create the partition server(s) assigned to it in function block 61. The collaboration server then waits in function block 62 to hear back from each machine that each partition server being created on the machine is "in formation". The relative position service for each of the new partition(s) is created in function block 63, and the new partition(s) are added to the status structures. For the partition(s) on which the partition(s)-creating client needs to send out a compound modification, the current relative positions are noted for being returned to the partition(s)-creating client in function block 64. Finally, the relative position of each partition is incremented in function block 65.

After a client has got a proposal for deletion of partition(s) approved, the client contacts the collaboration server with a request for deletion of partition(s). The collaboration server processes a deletion request as the following activity on its time line of computation: in order to be able to recall later, the collaboration server marks the current activity on the time line as specific history server(s)' creation event from partition server(s); the collaboration server notes the current relative position for each of the partitions on which a compound modification announcing the deletion of partition (s) has to be sent out (minimally, the partition(s) being deleted have to be included); the collaboration server next withdraws the relative position service for the partition(s) being deleted, and increments the relative position of each of any remaining partitions whose relative position has been noted; the collaboration server shifts the partition server(s) being deleted from the (status structure) set of current partition servers to the (status structure) set of current history servers. After this activity, the collaboration server sends the noted relative positions to the client which requested the deletion of partition(s) and deletes its portion of the channel(s) going to the partition server(s) being deleted.

Upon receipt of relative positions from the collaboration server, the deletion-requesting client sends out a compound modification announcing deletion of partition(s) using the relative positions. Each client processes a serialized compound modification for deletion, atomically as follows. The client makes each deleted partition unavailable to the collaboration participant; then, for each deleted partition server, the client places a final cleanup message on the outgoing channel to the server, and after the message has been sent, deletes its (the client's) portion of the channel.

A partition server continues its ordinary behavior with some changes after it has picked a deletion modification for itself and placed it on its FIFO queue. The changes in its behavior are as follows. The server looks for cleanup messages coming from clients, and when the server encounters a cleanup message, it blocks the cleanup message, until it has received a cleanup message from each of its channels coming from clients. The server then deletes all cleanup messages and puts out one acknowledgment of cleanup into its FIFO queue for broadcast to all clients. After the acknowledgment of cleanup has been broadcast, the server dismantles its portion of all channels, and converts into a history server.

Each client ignores all modifications on a partition for which it has processed a serialized compound deletion modification. When a client gets an acknowledgment of cleanup from a partition server, it dismantles its portion of the incoming channel from the server.

Figure 7:
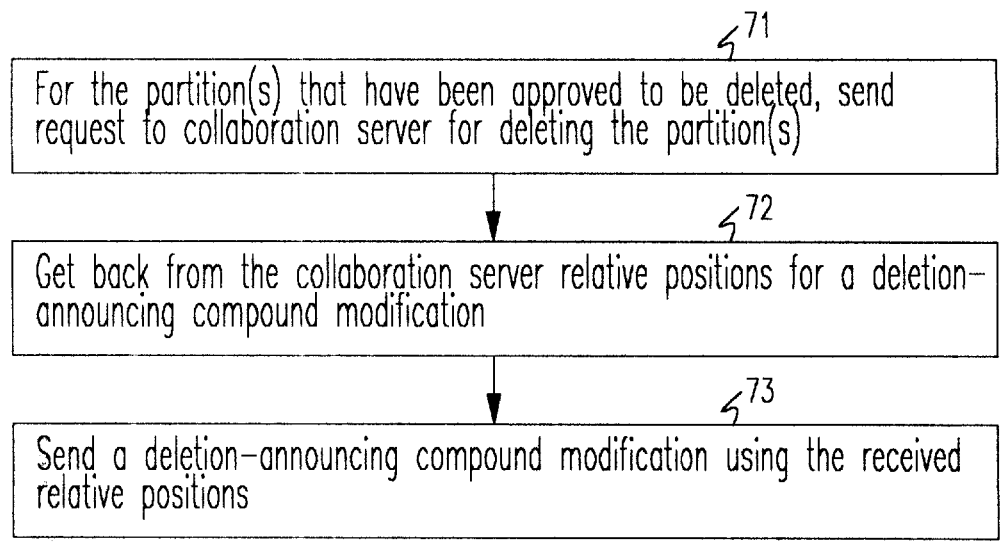
FIG. 7 is a flow diagram showing the procedure followed by a client for deleting existing partion(s)
Figure 8:
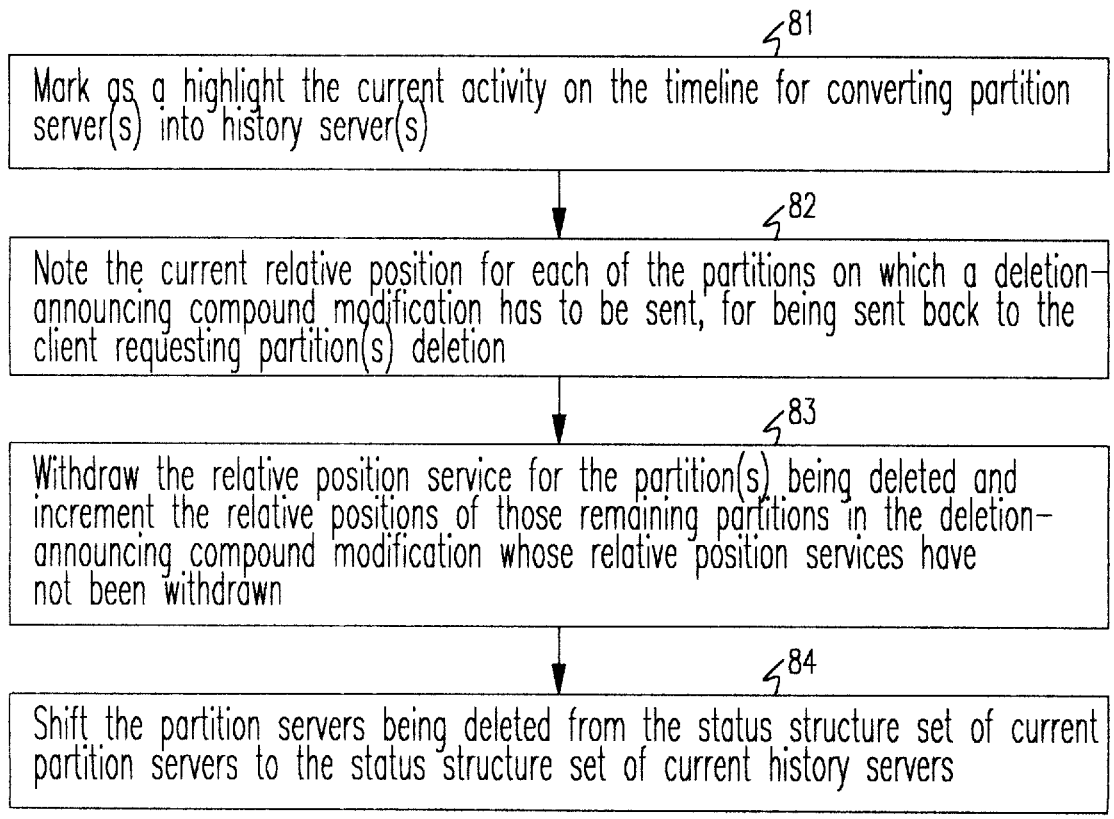
FIG. 8 is a flow diagram showing the activity carried out by the collaboration server on its time line for a partition (s)-deletion request.

The procedure and time line activity followed for deleting existing partition(s) is illustrated in FIGS. 7 and 8. The procedure followed by the client is shown in FIG. 7, to which reference is now made. The client sends a request to the collaboration server for deleting the partition(s) in function block 71. The client gets back from the collaboration server relative positions for a deletion-announcing compound modification in function block 72. Then, in function block 73, the client sends a deletion-announcing compound modification using the received relative positions.

FIG. 8 shows the activity carried out by the collaboration server on its time line for a partition(s)-deletion request. The collaboration server marks as a highlight the current activity on the time line for converting partition server(s) into history server(s) in function block 81. The current relative position for each of the partitions on which a deletion-announcing compound modification has to be sent is noted in function block 82, for being sent back to the client requesting partition(s) deletion. The collaboration server then withdraws the relative position service for the partition(s) being deleted and increments the relative positions of those remaining partitions in the deletion-announcing compound modification whose relative position services have not been withdrawn in function block 83. Finally, in function block 84, the partition servers being deleted are shifted from the status structure set of current partition servers to the status structure of current history servers.

A creation/deletion server is an option that is especially useful when partition(s) creation/deletion permission does not require the entire state of the work space to be available, and when the chances of rejection of a creation/deletion request are significant. An alternative to the creation/deletion server that makes available the entire state of the work space synchronously for permission-related processing is as follows. A client interested in creation/deletion of partition(s) sends a compound modification over all partitions including display making clear its intention. When the serialized compound modification is processed, every client knows (i.e., can compute locally since all necessary information is available) whether the permission requested is there or not. Since the compound modification is over all partitions, each client's knowledge of the permission is based on a synchronized snapshot of the complete shared work space, and includes knowledge of previously pending but not implemented creations/deletions of partitions.

The above creation/deletion server alternative is illustrated in FIG. 4. In this alternative to the creation/deletion server, if the chances of rejection of creation/deletion request are insignificant, then it may be worth modifying the sequence of steps carried out in getting permission for partition(s)' creation/deletion and the actual implementation of the permission. For example, the compound modification for broadcasting initial value of new partition(s) can be eliminated and the initial value can be carried by the compound modification that requests permission for the partition(s)' creation. The order in which creations and deletions of partitions occur, i.e., the order in which creations and deletions are seen by collaboration participants, is given by the order in which compound modifications for implementing the creations and deletions are sequenced by the collaboration server. The order is not the order in which permission for the creations and deletions is granted to the clients. The order in which permission is granted can be made to be the order in which the creations and deletions are implemented.

One way of doing this in the case when no separate creation/deletion server is used (see alternative above) is as follows. Say, each client with an approved creation/deletion proposal (a compound modification) sends a creation/deletion request to the collaboration server along with a list of all pending (unimplemented, approved creation/deletion proposals) such modifications that precede it. The collaboration server can then arrange all such requests in the order in which the permissions for the creations/deletions were granted.

Splitting of a partition can be carried out using locking of partitions described in a later section. A client interested in splitting a partition first acquires a lock on the partition. After acquiring the lock, the client checks to see if the partition state is still something that the client would like to split. If it is, then the client seeks permission for the creation of partition(s) in which the client would like to distribute portions of the original partition. If the client gets permission for the creation of partition(s), then the client proceeds with the splitting of the original partition by cutting out those portions of the original partition that have to be distributed elsewhere. The client then releases the lock on the original partition. The client follows this up by creating partition(s) for which it had acquired permission in the locked section. The initial value of the new partition(s) comprises of the cut out portions of the original partition.

Figure 15:
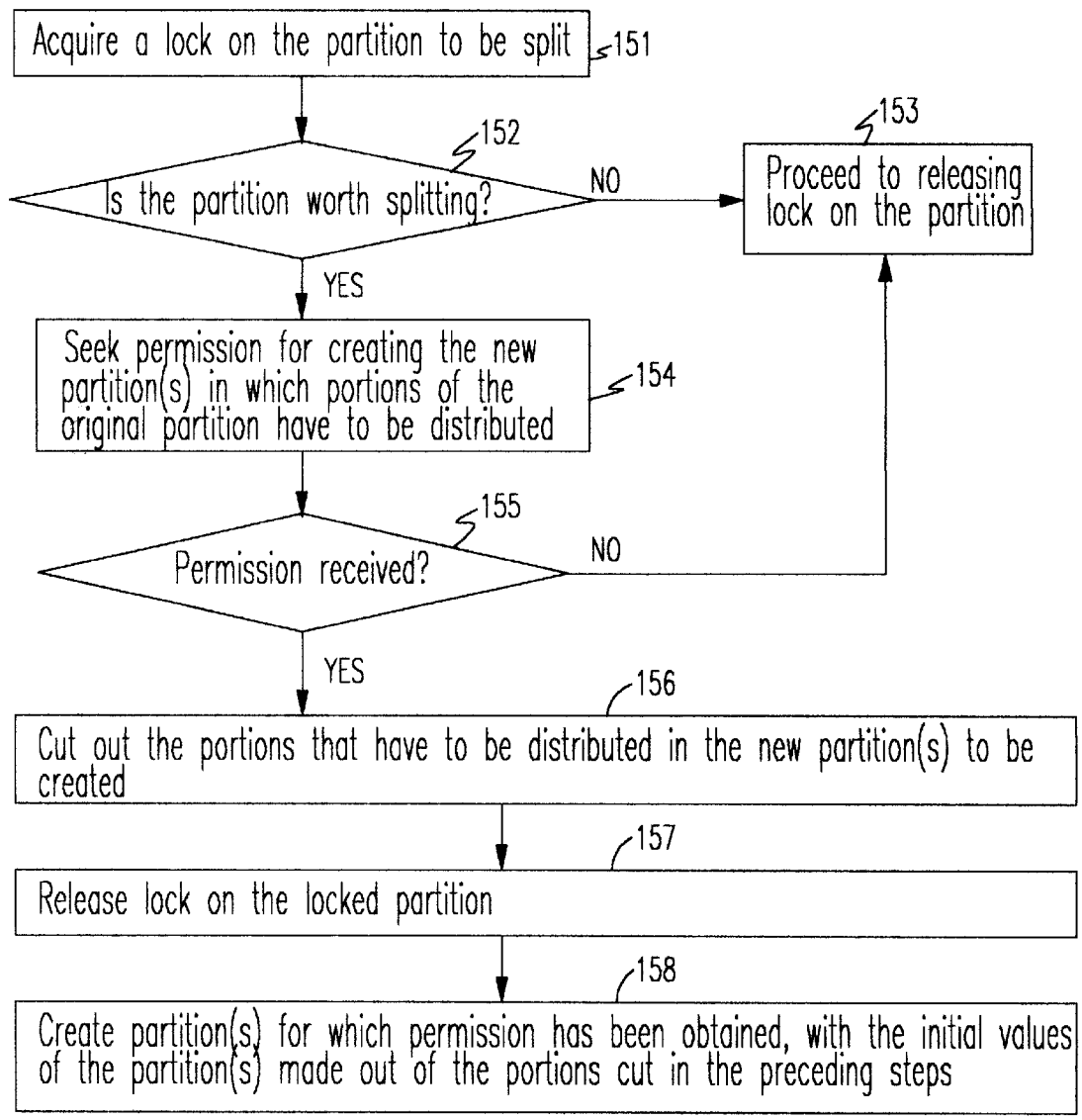
FIG. 15 is a flow diagram showing the procedure by which a client can split a partition into multiple partitions.

Splitting of a partition is illustrated in FIG. 15. The client first acquires a lock on the partition to be split in function block 151. A test is next made in decision block 152 to determine if the partition is worth splitting. If not, the lock on the partition is released in function block 153, but if so, the client seeks permission in function block 154 for creating the new partition(s) in which portions of the original partition have to be distributed. A test is then made in decision block 155 to determine whether permission is received. If not, the lock is released in function block 153. If permission is received, portions of the partition that have to be distributed in the new partition(s) to be created are cut out in function block 156. The lock is released on the locked partition in function block 157. Then, in function block 158, the partition(s) are created.

Figure 16:
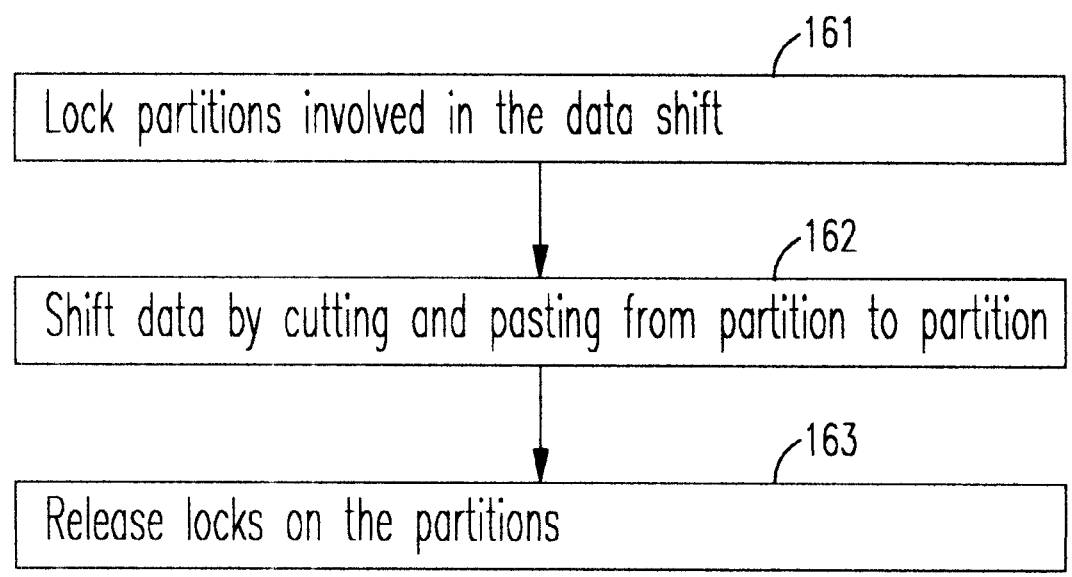
FIG. 16 is a flow diagram showing the procedure by which a client can shift data across partitions.

A client can shift data across partitions by locking the partitions concerned and then cutting and pasting data from partition to partition. Shifting data across partitions is illustrated in FIG. 16. The client first locks the partitions involved in the data shift in function block 161. The data is then shifted by cutting and pasting from partition to partition in function block 162. Finally, the locks are released in function block 163.

A client can merge partitions by acquiring locks on the partitions to be merged. Upon acquiring locks, if the client finds that the partitions' state is still something that it would like to merge, then the client seeks permission for the deletion of that subset of the partitions which it would like to eliminate in the process of merging. If permission for the deletion is granted, then the client proceeds with the merging. It does so by shifting all data from the to-be-deleted partition(s) into the remaining partition(s). After emptying the to-be-deleted partition(s) into the remaining partition(s), the client releases all locks on the partitions being merged. The client then follows this up by deleting the partition(s) for which it had acquired permission during the locked section.

Figure 17:
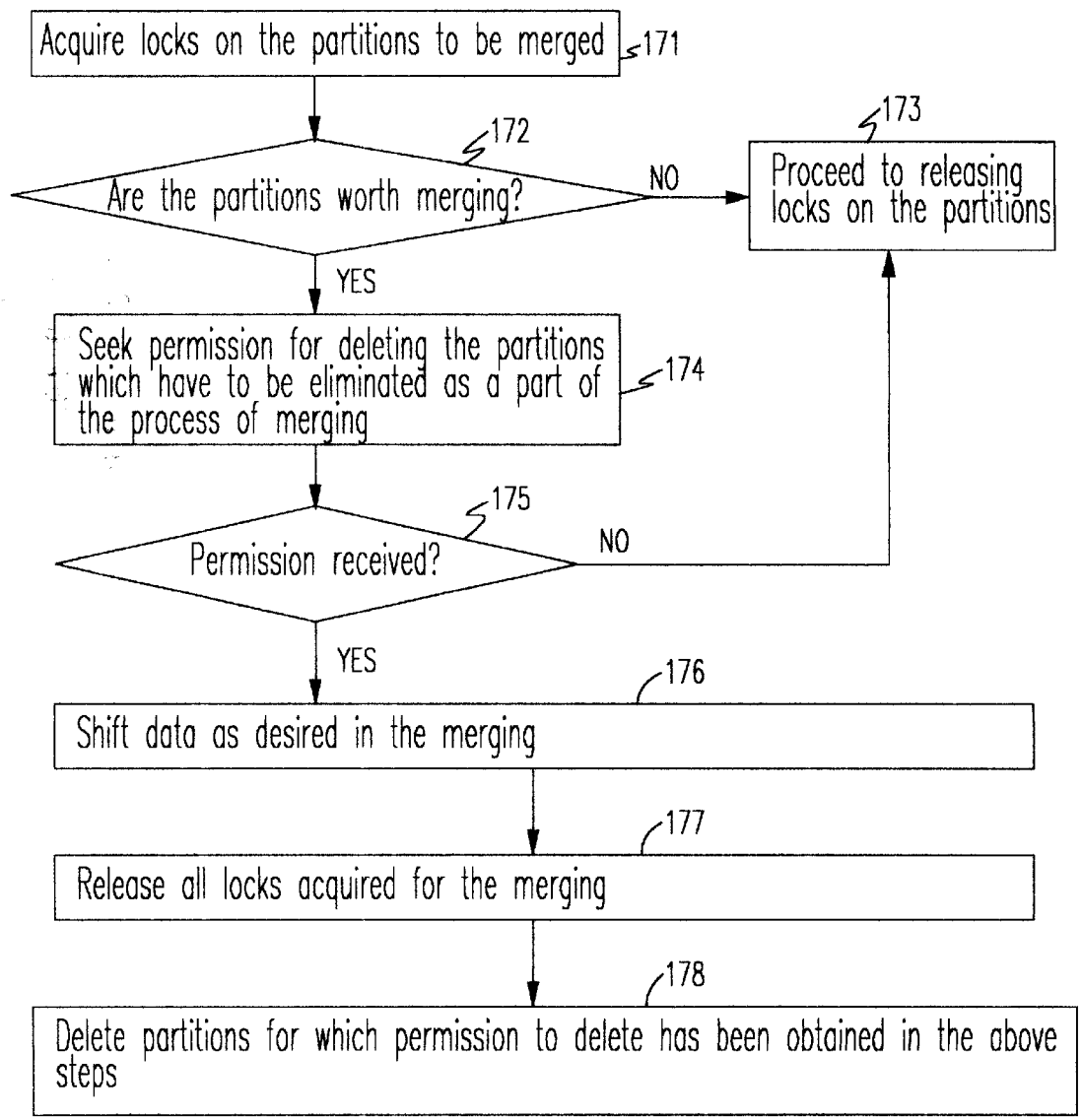
FIG. 17 is a flow diagram showing the procedure by which a client can merge partitions into a lesser number of partitions.

Merging partitions is illustrated in FIG. 17. The client first acquires locks on the partitions to be merged in function block 171. A test is then made in decision block 172 to determine if the partitions are worth merging. If not, the locks are released in function block 173, but if so, the client seeks permission for deleting partitions which have to be eliminated as part of the process of merging in function block 174. A test is then made in decision block 175 to determine if permission is received. If not, the locks are released in function block 173. If permission is received, data is shifted as part of the merging process in function block 176. All locks are released in function block 177. Finally, the partitions are deleted in function block 178.

Dynamic Addition and Removal of Clients

A client that seeks to be added to a collaboration session midway through the session has to contact the collaboration server with a request for the purpose. The client can get the current address of the collaboration server from an introducing client that is already present in the collaboration session. It is possible that when the client seeking addition tries to contact the collaboration server at the address the client has got from the introducing client, the collaboration server is found to be gone because its migration occurred prior to the client's getting there. In this case, the client has to repeat the process of getting the collaboration server's address from the introducing client and trying to contact the collaboration server. The process has to be repeated till the client makes contact with the collaboration server. A collaboration server in contact with a client seeking addition processes the client addition request as the following activity on its time line of computation: in order to be able to recall later, the collaboration server marks the current activity on the time line as a specific client's addition event; the server records the new client as added to the set of current clients (status structure); the server notes value of the (status structures) set of current partition servers (which includes display) and current history servers for returning to the client (for each server, the machine location is included); if the optional creation/deletion server is being used, then the current machine location of the server (taken from status structure) is noted for communicating to the client; the server notes the current relative position on each current workspace partition including display, and then increments the relative position for each partition.

After this activity, the collaboration server returns the noted sets of partition servers and history servers, the location of the creation/deletion server if it has been noted, the noted relative positions, and the initial (i.e., at start of collaboration) workspace structure including initial partitions and initial shared display to the client seeking addition. The client seeking addition then communicates with all current partition servers it has received information about to establish forward and backward channels to the partition servers. Using the relative positions it has received, the client places a compound modification on all partitions announcing client addition on the forward channels it forms to the partition servers.

This step can take time as some partition servers can be "in formation" or "in formation due to migration" (explained in migration section). Simultaneously with the channel formation activity, or otherwise, the client communicates with the current partition servers or current history servers (i.e., subsets of the server sets that the client has received from the collaboration server) that represent the initial workspace partitions. The client communicates with these servers to get the history of modifications made on the initial partitions as recorded in the servers. The client simulates a client that does not send any inputs on the initial partitions' initially shared display, using the modifications history. In this simulation, the client expands the set of partition servers/history servers it gets history information from (for simulation) whenever a partition(s) creation modification is simulated.

When the client contacts what it considers to be a history server for history information, it can find a delay in the service for its request as the history server may well not have converted from a partition server when the request arrives. The unconverted server is entitled to delay requests requiring service from it as a history server until it actually converts to be a history server. Regardless of delays, the client simulates the entire collaboration session that has transpired prior to the client's joining in the collaboration in order to arrive at the shared state of the other clients. The compound modification announcing the client's addition marks the boundary up to and including which the client does history simulation.

Upon request from a client, a partition server to which the client's compound client addition modification has been sent provides history information to the client up to and including the compound modification announcing the client's addition. The partition server then switches to sending modifications by the regular channel to the client. After a client has simulated its own client addition compound modification, the client shuts off all history communication and simulation, and turns into a regular inputting client connected (there may be a delay as channels get fully formed) to the partition servers over which its compound client addition modification is defined.

A client can throw away initial partitions and history modifications after they have been used in its simulation process. During joining formalities, from when a client sends a request to the collaboration server seeking addition and up to when the client turns into a regular client, if a new partition server that is being created concurrently contacts the client to establish forward and backward channels to it, the channels should be established at a priority above the simulation process. A client addition compound modification can be optionally used by pre-existing clients to flash an addition message on their displays without changing the state of the shared workspace.

Figure 9:
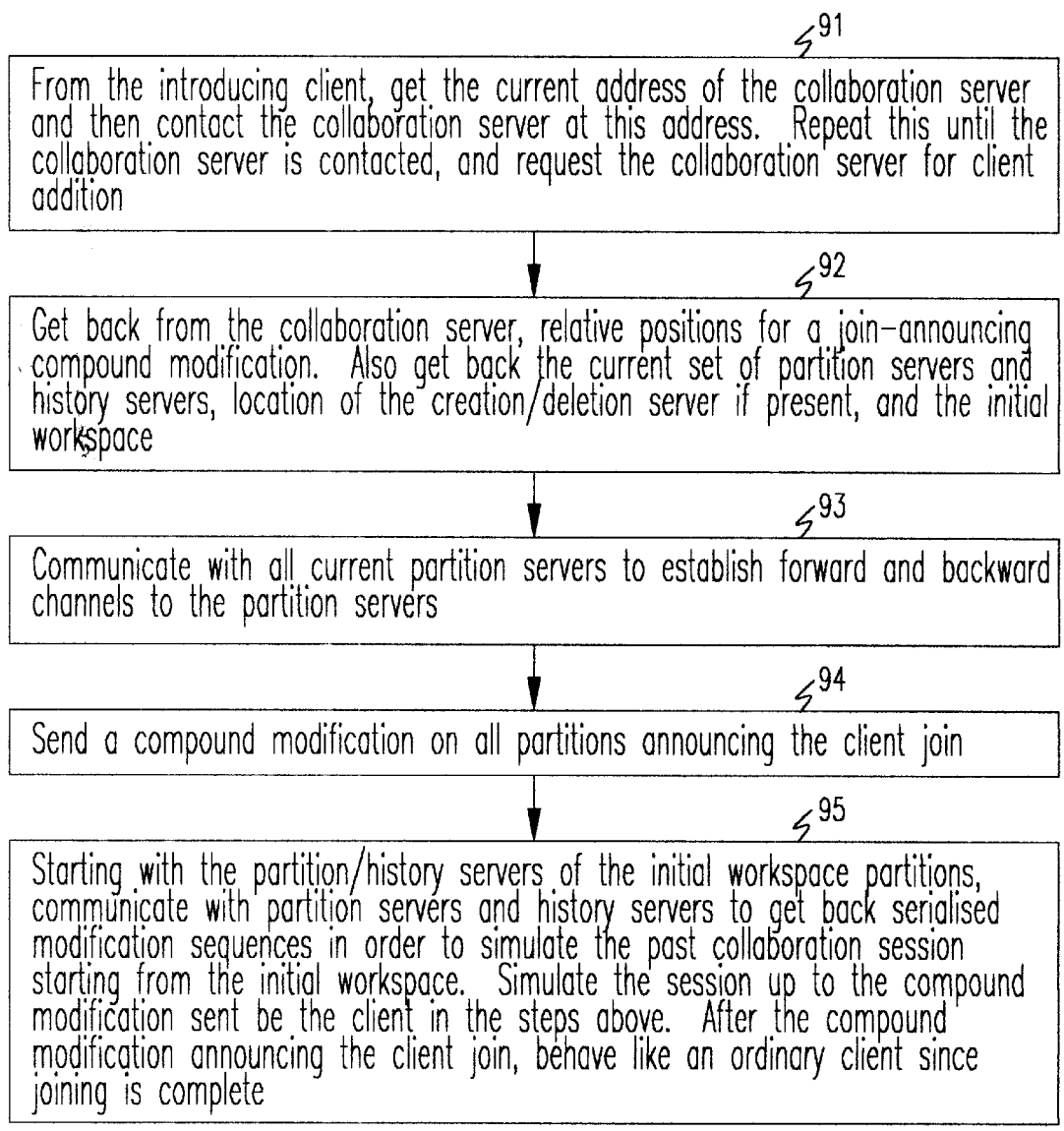
FIG. 9 is a flow diagram showing the procedure followed by a client for joining an ongoing collaboration session.
Figure 10:
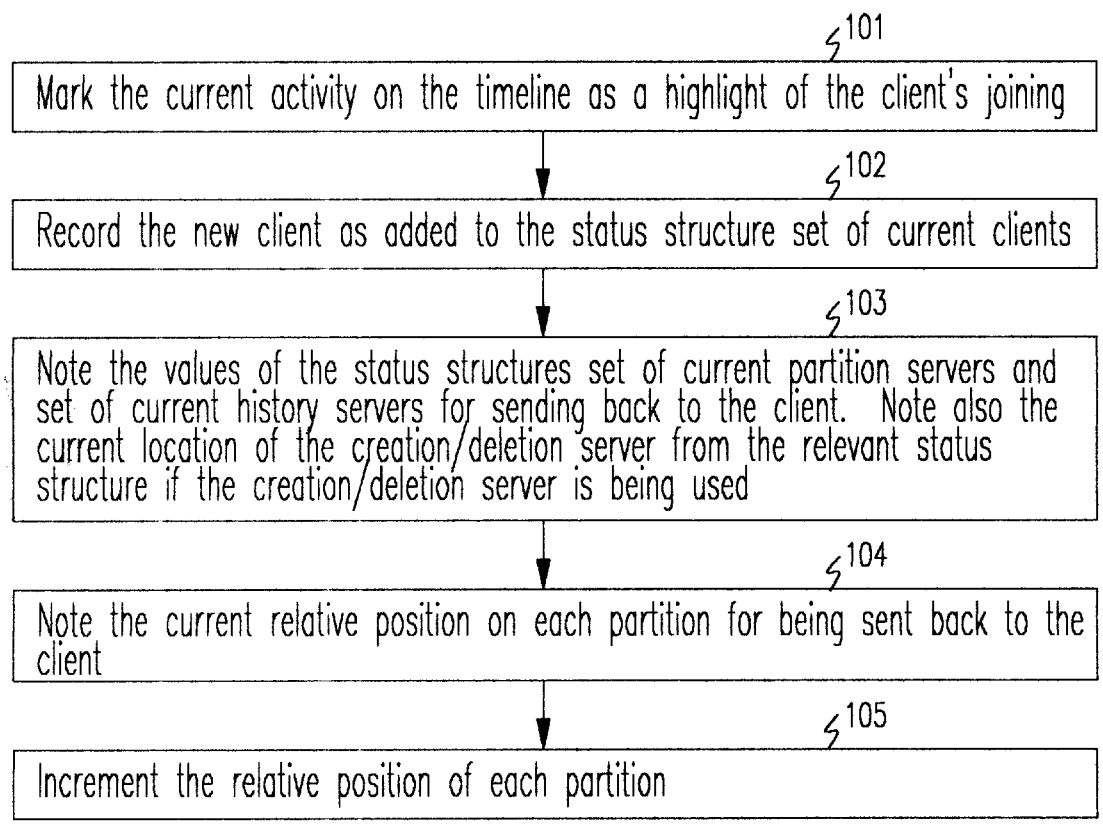
FIG. 10 is a flow diagram showing the activity carried out on the time line by the collaboration server in response to a client's joining request.

The procedure and time line activity followed for a new client's joining is illustrated in FIGS. 9 and 10. Referring first to FIG. 9, there is shown the procedure followed by the client for joining an ongoing collaboration session. The client gets the current address of the collaboration server from the introducing client in function block 91. The client then contacts the collaboration server at this address and requests to be added to the collaboration session. The client then receives from the collaboration server relative positions for join-announcing compound modification in function block 92. The client also gets from the collaboration server the current list of partition servers and history servers and, if present, the creation/deletion server and the initial work space. The client then communicates with the current partition servers in function block 93 to establish forward and backward channels to the partition servers. The client sends a compound modification on all partitions announcing the client join in function block 94. Starting with the partion/history servers of the initial work space partitions, the client communicates with the partition servers and history servers to get back serialized modification sequences in order to simulate the past collaboration session starting from the initial work space in function block 95. The client simulates the session up to the compound modification announcing client join, and behaves like an ordinary client once the joining is complete.

FIG. 10 shows the activity carried out on the time line of the collaboration server in response to the client's joining request. The collaboration server marks the current activity on the time line as a highlight of the client's joining in function block 101. The new client is recorded by the collaboration server in function block 102 as added to status structure set of current clients. The values of the status structures set of current partition servers and set of current history servers is noted by the collaboration server for sending back to the joining client in function block 103. The current location of the creation/deletion server, if any, is also noted. Then, in function block 104, the current relative position on each partition is noted for being sent back to the joining client. Finally, the relative position of each partition is incremented in function block 105.

A client that seeks to withdraw from a collaboration session before the session is over has to contact the collaboration server with a request for the purpose. The collaboration server processes such a request as the following activity on its time line of computation: the server records the client as deleted from the (status structure) set of current clients; the server notes the current relative position on each current workspace partition including display, and then increments the relative position for each partition.

After this activity, the collaboration server returns the noted relative positions to the client seeking withdrawal. The client seeking withdrawal then sends out a compound modification over all partitions using the relative positions it has received, announcing its withdrawal from the collaboration session. In processing a client's compound client deletion modification, a partition server stops the use of the channel going to the client and dismantles its portion of the client's incoming and outgoing channels, after it has broadcast the client's compound deletion modification.

In processing its own serialized client deletion modification, a client dismantles all of its portion of incoming and outgoing channels to partition servers covered in the compound client deletion modification. There may still be servers that the client is connected to—deleted partition servers that have not yet converted to history servers or whose acknowledgment of cleanup messages have not yet been processed. For each of these servers, the client has to wait for the server's acknowledgment of cleanup message upon which it can dismantle its portion of the server's incoming channel.

Note that a client may have to send a cleanup message to a deleted partition server after it has sent a client deletion compound modification on other partitions. This is perfectly fine, and the client will remove its portion of the outgoing channel to the server upon sending out the cleanup message. A client is free to disconnect only after all of its portion of channels to partition/history servers has been removed.

Figure 11:
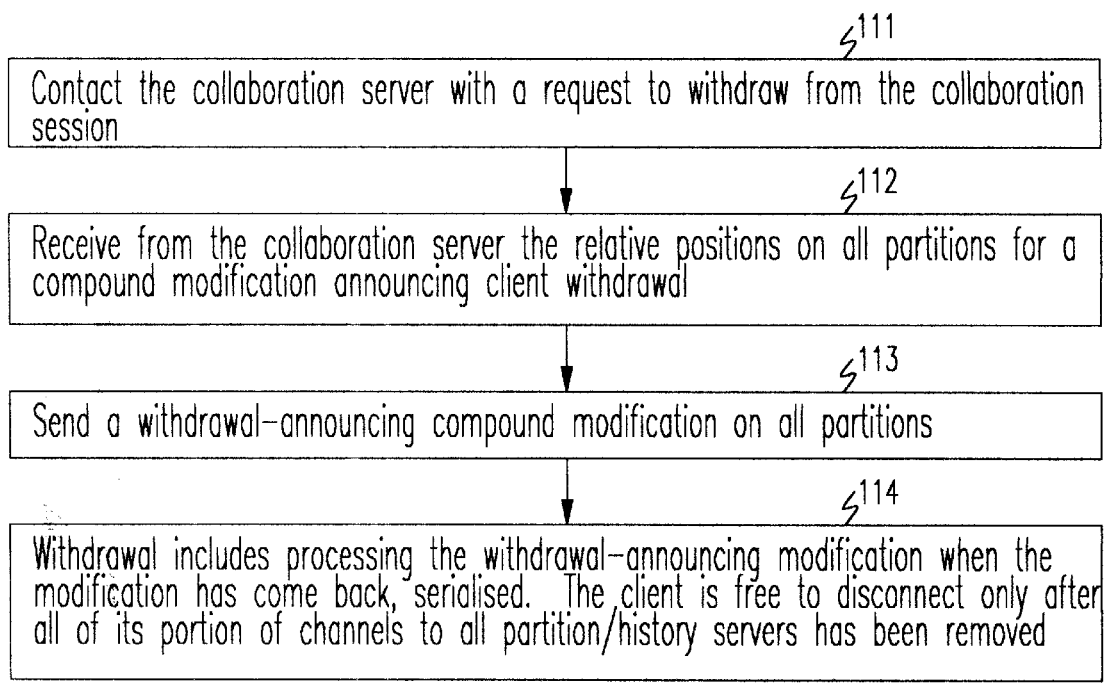
FIG. 11 is a flow diagram showing the procedure followed by a client in withdrawing from an ongoing collaboration session.
Figure 12:
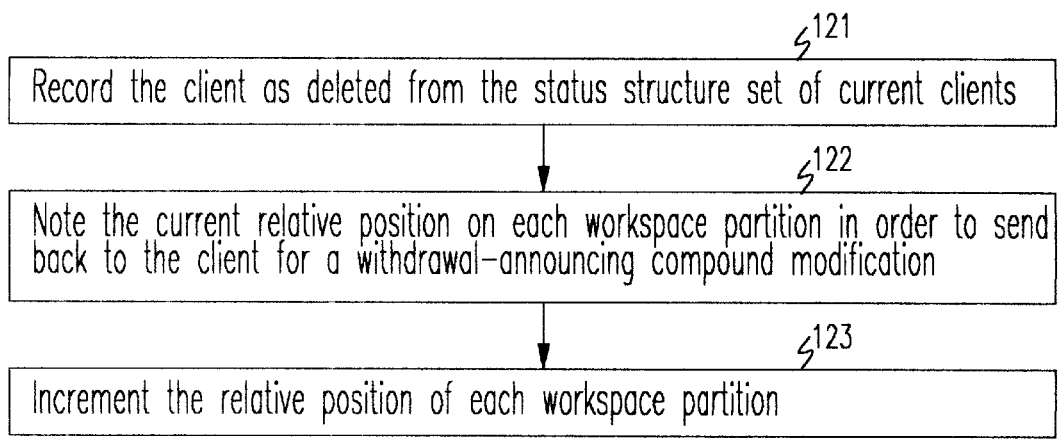
FIG. 12 is a flow diagram showing the activity carried out on the time line by the collaboration server for a client-withdrawal request.

The procedure and time line activity followed for an existing client's withdrawal is illustrated in FIGS. 11 and 12. Referring first to FIG. 11, the procedure followed by a client in withdrawing from an ongoing collaboration session is initiated by the client contacting the collaboration server in function block 111 with a request to withdraw from the collaboration session. The client receives the relative positions on all partitions for a compound modification announcing client withdrawal from the collaboration server in function block 112. The client then sends a withdrawal-announcing compound modification in all partitions in function block 113. Finally, the client processes the withdrawal-announcing modification when the modification has come back serialized in function block 114. The client is free to disconnect only after all of its portion of channels to all partition/history servers has been removed.

FIG. 12 shows the activity carried out on the time line by the collaboration server for a client-withdrawal request. The collaboration server first records the client as deleted from the status structure set of current clients in function block 121. The current relative position on each work space partition is noted in function block 122 and sent back to the client for the withdrawal-announcing compound modification. Finally, the relative position of each work space partition is incremented in function block 123.

Locking of Partitions

A partition can be locked by a client using one of the mechanisms given in this section. When a client has a lock on a partition, then only that client is allowed to make modifications to the partition. If a client needs to lock one or more partitions for some time, without any plans for creation or deletion of partition(s) in the workspace during this time, and without any plans of its own removal from the collaboration session during this time, then the client can do the following. The client communicates with the collaboration server to get a block of adjacent relative positions on workspace partitions. The block of relative positions has to cover all the compound modifications that the client intends to send out during the time it holds lock(s) on some partition(s). This includes the locking and unlocking operations on the desired-to-be-locked partition(s) themselves, which are implemented as compound modifications in this mechanism.

A simple means for getting a block of relative positions is for the client to inform the collaboration server of how many adjacent relative positions it needs for each partition that it desires relative positions on. The collaboration server can process this request on its time line of computation as the following activity: the server notes the current relative position for each desired partition; the server then increments the relative position of each desired partition by the number of adjacent positions requested on the partition (note that this differs from the usual relative position service wherein the increment is a fixed one). After this activity, the collaboration server informs the client of the relative position noted for each desired partition along with the number of adjacent positions that have been reserved as requested on the partition.

From the block of relative positions that the client has got, using the most preceding relative position on each of the partition(s) that the client wants to lock, the client sends out a compound modification on the partition(s) to be locked, that announces the locking of the partition(s). When a partition server picks (and places in its FIFO queue) a compound modification announcing the locking of the partition server's partition, then the partition server changes its behavior as follows. It blocks modifications on all incoming channels except the channel belonging to the locking client. Then, it unblocks the incoming channels and reverts back to usual behavior only when it has picked a compound modification that announces the unlocking of its partition.

From among the block of relative positions a locking client gets, for each of the partition(s) the client seeks to lock, the client has to reserve the most succeeding relative position for a compound modification on all partition(s) sought to be locked for announcing the unlocking of the partition(s). As is usual, a relative position on a partition can be used in at most one compound modification. In a locking client's block of relative positions, the positions that are not used or reserved for use in locking or unlocking are free to be used in any compound modifications the client desires.

The client can consult with the collaboration server in using these relative positions. The client has to work within its block of adjacent relative positions for all the compound modifications it generates while holding lock(s) on partition (s). Working within a pre-allocated block of adjacent relative positions prevents the occurrence of the following kinds of possible deadlock situations. A lock-holding client communicates with the collaboration server to get relative positions for a compound modification which (through relative-position dependencies) turns out to succeed another compound modification that the server has sanctioned to another client. The lock-holding client can very well find its compound modification blocked awaiting the passage of the preceding modification, and the preceding modification can find itself blocked because of the channel blocking that has occurred due to the locking of partition(s).

To prevent any of such deadlock situations from arising, it is required that if a compound modification is needed and relative positions for it are not available in a locking client's relative positions block, then the client has to drop the lock(s) (i.e., unlock partition(s)) and try locking again later. In using its relative positions block, a client is free to send out compound modifications that are non-operations which only serve the purpose of advancing the relative positions on various partition(s). This may be necessary at times because a locking client has to use up the entire block of relative positions it gets, regardless of whether it has useful compound modifications for the relative positions or not. A locking client can follow the usual manner of interspersing ordinary modifications in between the compound modifications it sends out.

The locking mechanism described above excludes any creation or deletion of partition(s) while a lock is held.

Creation or deletion of partition(s) while a lock is held can be added to the mechanism above by changing it as follows. The changed mechanism requires a pre announcement of the creation or deletion. Permission for creation or deletion has to be acquired prior to attempting locking of partition(s). After the permission is acquired, the collaboration server has to be contacted for a block of relative positions as in the mechanism above, except that at this time, the creation or deletion has also got to be announced to the collaboration server. As in the mechanism above, the block of relative positions has to cover all compound modifications that will be carried out while lock(s) are held. Thus, the compound modification needed for announcing the creation (initial value of new partition(s)) or deletion has to be covered in the requested block of relative positions.

When the collaboration server gets a request for a relative-positions block along with a pre announced creation or deletion, it processes the request as the following activity on its time line of computation: if the request contains a pre announced creation, then except for reserving relative positions for the creation-announcing modification, the server carries out the same activity that it does on its time line of computation in the case of an ordinary creation—initiating the creation of new partition server(s) for the partition(s) given the set of current clients and collaboration server, hearing back that the server(s) are "in formation", initiating the relative positions service for the new partition(s), and finally, adding the new partition server(s) to the set of current partition servers; the collaboration server reserves a block of relative positions as in the case of the locking mechanism presented previously (the block has to include positions for the modification announcing creation or deletion); then, if the request contains a pre-announced deletion, then following ordinary deletion, the collaboration server marks the deletion as a highlight on its time line, withdraws the relative positions service for each of the partition(s) to be deleted, and for each of the to-be-deleted partition(s), shifts its partition server from the set of current partition servers to the set of current history servers.

After this activity, as in the locking mechanism given previously, the collaboration server returns the reserved block of relative positions to the lock(s)-requesting client. In the case of a pre announced deletion, the collaboration server also deletes its portion of the channel(s) going to the partition server(s) to be deleted. The lock(s) requesting client can use the block of relative positions it gets as it does in the locking mechanism given previously, provided it meets the requirements of the following additional and overriding constraints. In the case of a pre announced creation, the most preceding relative position over each of the new partition(s) has to be used in the one modification that announces the initial value of the new partition(s). In the case of pre announced deletion the most succeeding relative position over each of the partition(s) to be deleted has to be used in the one compound deletion modification for deleting the partition(s).

Departing from the practice of the locking mechanism given previously, the locking mechanism with pre announced creation or deletion allows a deletion modification of a partition to also serve as the unlocking modification for the partition. Since partition servers are oblivious of which locking mechanism is used at any time, the behavior of partition servers as described in the previous locking mechanism is modified as follows to apply to both locking mechanisms uniformly. A partition server unblocks the incoming channels it has blocked due to locking either when it has picked (and placed in its FIFO queue) a compound modification announcing the unlocking of its partition, or when it has picked (and placed in its FIFO queue) a compound modification announcing the deletion of its partition. Once a partition server has unblocked its locking-blocked incoming channels, it reverts back to its usual behavior of picking from various incoming channels.

If unblocking occurs due to a deletion modification, then the partition server also proceeds with the usual procedure for deletion of a partition. Any locked partition(s) that are not unlocked by a deletion modification have to be unlocked (as usual) by one compound unlocking modification that uses the most succeeding relative positions for the partition (s) in the relative positions block available with the locking client.

For the sake of simplicity of presentation, the locking mechanisms described above only allow one stretch of locking per relative-positions block got from the collaboration server. Again, for the sake of simplicity of presentation, the pre-announcing locking mechanism only allows either one creation, or one deletion of partition(s) while lock(s) are held. It is straightforward to implement generalizations such as multiple locking stretches per relative-positions block, separate locking and unlocking of partitions within a relative positions block, multiple creations and/or deletions while lock(s) are held, and lock sharing among multiple clients. In case of lock sharing, a partition server blocks the modifications of all clients except those which hold a shared lock on the partition.

Figure 13:
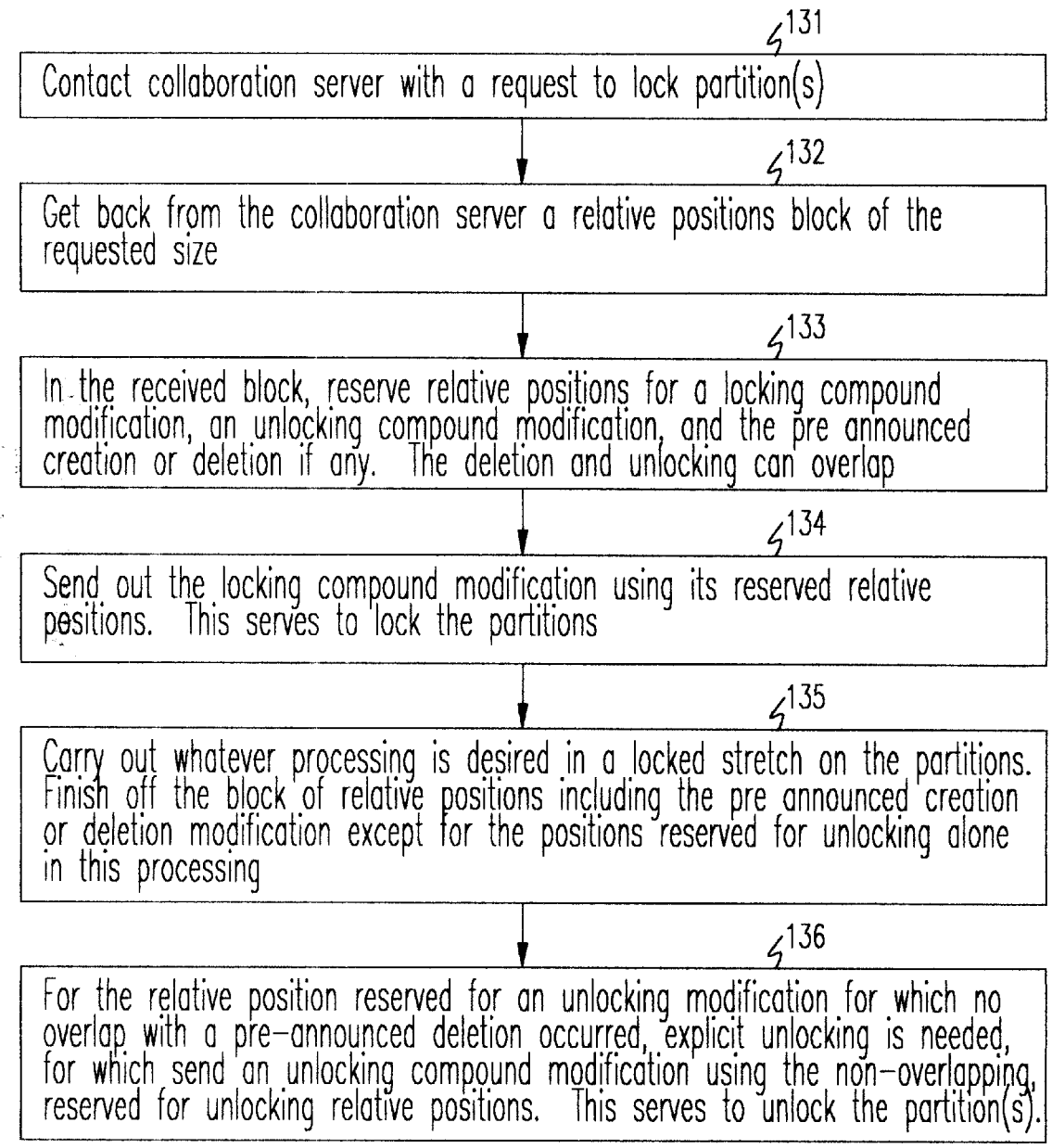
FIG. 13 is a flow diagram showing the procedure followed by a client for implementing a locking stretch over some partition(s)
Figure 14:
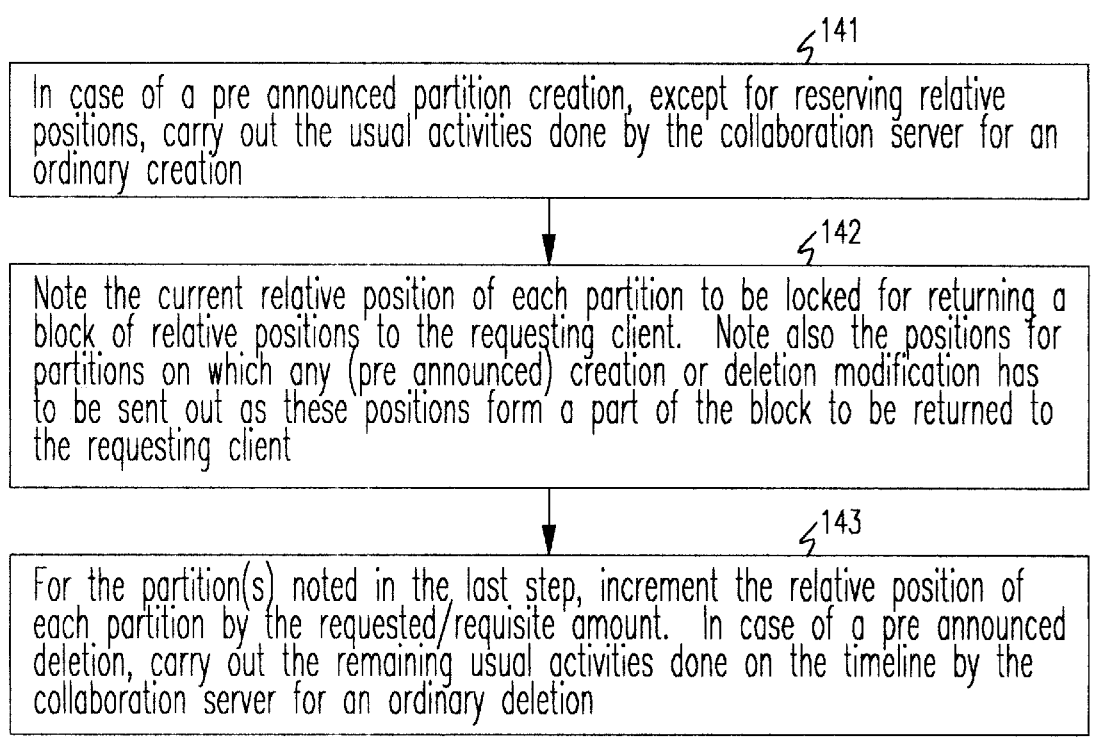
FIG. 14 is a flow diagram showing the activity carried out on the time line by the collaboration server for a locking request.

The procedure and time line activity followed for a locked stretch is illustrated in FIGS. 13 and 14. Referring first to FIG. 13, the procedure followed by the client for implementing a locking stretch over some partition(s) begins in function block 131 when the client contacts the collaboration server with a request to lock partition(s). The client gets back from the collaboration server a relative positions block of the requested size in function block 132. The client reserves relative positions for a locking compound modification, an unlocking compound modification, and the pre-announced creation or deletion, if any, in function block 133. The client then sends out the locking compound modification using its reserved relative positions in function block 134. This serves to lock the partitions. The client can now carry out whatever processing is desired in a locked stretch on the partitions in function block 135. If there is no pre-announced deletion overlapped with some of the positions reserved for an unlocking modification, then explicit unlocking is required and carried out in function block 136.

FIG. 14 shows the activity carried out on the time line of the collaboration server for a locking request from a client. The collaboration server on receiving a locking request with pre-announced creation from a client carries out the activities for an ordinary creation (except reserving relative positions) in case the locking request has a pre-announced creation part in function block 141. The collaboration server notes at least the relative position of each partition to be locked and returns a block of relative position of each partition to be locked and returns a block of relative positions to the requesting client in function block 142. Finally, the collaboration server increments the relative position of each above-noted partition by the requisite amount in function bock 143, followed by the remaining usual deletion activities in case of a pre-announced deletion.

Migration of Distributed Server

The distributed server comprises of multiple servers resident on one or more host machines. In order to handle changes in the network of machines supporting a collaboration session without disrupting the session, the servers making up the distributed server have to be capable of migrating from machine to machine, dynamically. Causes that bring about migration of servers can vary from disconnection of some host machine(s) from the network to an optimization strategy that shifts servers to more powerful and/or better connected machines whenever such machines become available. This section provides mechanisms by which servers comprising the distributed server and the optional, externally-provided creation/deletion server can migrate from machine to machine, dynamically. Each of the mechanisms is controlled by the collaboration server, which is in charge of all server migrations related to the distributed server.

Partition Server Migration

The collaboration server defers migrating any partition server with the status "in formation due to migration" up to when the partition server no longer has this status. The collaboration server can determine the status of a partition server by polling, or the arrangement can be such that a partition server informs the collaboration server whenever its status changes to be different from "in formation due to migration".

In migrating one or more partition server(s), none of which is "in formation due to migration", using just one compound modification for the purpose, the collaboration server carries out the following activity on its time line of computation: the collaboration server notes the current relative position on each of the partition(s) whose partition server(s) are to be migrated for a compound modification that will be used in the migration purpose; next, for each partition whose relative position is noted, the collaboration server increments the relative position pointer to point to the next available position; next, for each of the partition server(s) being migrated, the collaboration server assigns a machine to host the migrated partition server, and contacts the machine with a request to build a copy of the un-migrated partition server (the instructions for building the copy are as follows. The copy is to build channels as usual to and from all clients presently contained in the status structure set of current clients (whenever a migrated partition server under construction contacts a client to form channels to it, it informs the client which partition server it is a migrated copy of, so that the client can discriminate and use correctly multiple servers for the same partition, and servers for other partitions). The copy is to also build an incoming channel from the current (location of the) collaboration server. All history of modifications available with the un-migrated partition server is to be copied up to, when the un-migrated partition server broadcasts a compound modification for migration using the relative positions noted by the collaboration server in the current time line activity (above). The aforesaid compound modification for migration is not to be copied into the modifications history information—instead, the migration modification is to be replaced by a compound no operation over the same partitions in the modifications history information (i.e., the history of migrations is not recorded deliberately, although it is straightforward to do so). For each client presently contained in the status structure set of current clients, the copy is to build a temporary re-routing channel from the un-migrated partition server, over which modifications coming from the client to the un-migrated partition server will be re-routed to the migrated partition server); the collaboration server then waits to hear back from each of the machines contacted that each partition server being built on the machine is "in formation due to migration", which is the status of a migrated partition server under construction; for each of the partition server(s) being migrated, the collaboration server then replaces the un-migrated partition server by its migrated copy in the status structure, set of current partition servers; the collaboration server then sends a compound modification for migration over the partition(s) whose relative positions were noted above via its channels to the un-migrated partition server(s) for the partition(s).

After this activity, after ensuring that the compound modification is gone, the collaboration server deletes its portion of the channels to the un-migrated partition server (s), along with shifting as usual to processing other requests that may be waiting for the time line. For any partition server, a compound migration modification for itself is a last message that it broadcasts, after which it dismantles its portion of all outgoing channels. The partition server also dismantles its portion of the channel coming in from the collaboration server. The partition server then routes all incoming data via temporary re-routing channels to its migrated version. In case the migrated copy has not formed temporary re-routing channels to the partition server, then incoming data is blocked till the channels are formed. When a client processes a serialized compound migration modification, it sends a sign off message on each of its channels to the (un-migrated) partition server(s) being migrated as per the compound migration modification. The sign off is sent only if the client has not already sent off a client deletion compound modification for itself on channels to partition servers. Regardless of whether a client sends sign offs or not, and only after making sure that the sign offs are indeed gone in case they have been sent, a client deletes its portion of channels to and from un-migrated server(s) in processing a serialized compound migration modification.

When a client does not send sign offs due to its having sent off a client deletion modification, then the client simply waits for its client deletion modification to come back serialized, upon which for the partition(s) over which it would have sent sign off messages were it not in the process of deleting itself, it can process the client deletion modification by deleting its portion of the incoming and outgoing channels to the migrated partition server(s). For the other partitions over which the client deletion modification is compounded, the client processes the client deletion modification by carrying out its usual set of activities.

If a client has sent sign off message(s) to un-migrated partition server(s), then the client waits for channel(s) going to the migrated server(s) to become available after which it routes all outgoing traffic for the concerned partition(s) through the new channel(s). An un-migrated partition server waits to receive sign offs or client deletion modifications on all incoming channels from its clients, after which, after ensuring that the sign offs/client deletion modifications have been sent on the temporary re-routing channels and a full copy of modification history has been made to the migrated server copy, the un-migrated partition server dismantles itself including its history service.

For a temporary channel, standard channel pair for a client in a migrated partition server, the server picks data only from the temporary channel till a sign off or client deletion modification are picked. In case a sign off message is picked, the migrated partition server throws the sign off and the temporary channel away and then uses only the incoming standard channel for the client. In case a client deletion modification is picked, the client deletion modification is broadcast out as usual, after which, the standard incoming channel, the temporary incoming channel, and the outgoing channel to the client are deleted—the migrated partition server's portion of the channels. The status of a partition server remains "in formation due to migration" until the server has processed sign off/client deletion modifications from all clients that were current for the migration to the partition server (all clients that the migrated server started out to form channels to).

Figure 18:
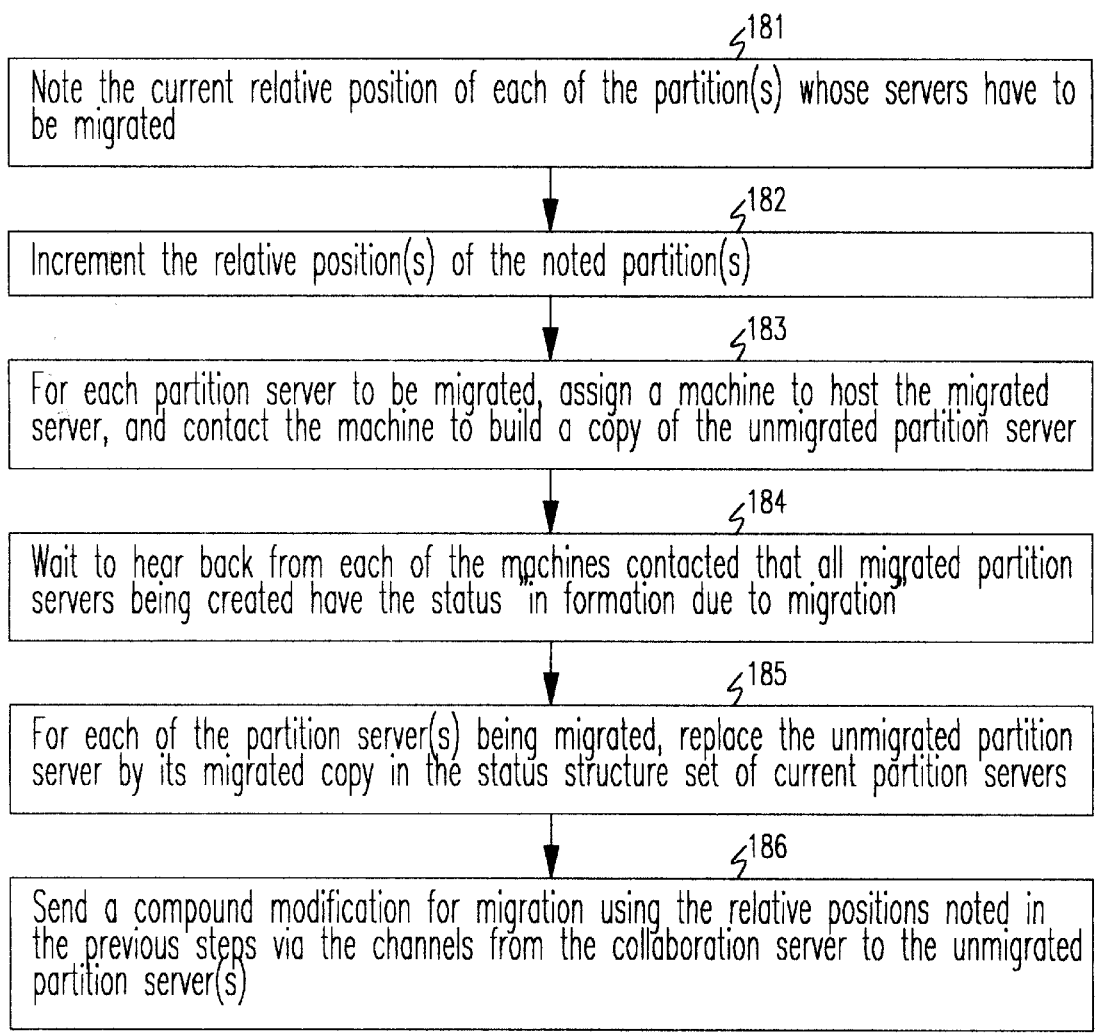
FIG. 18 is a flow diagram showing the activity carried out on the time line by the collaboration server for migrating some partition server(s)

The time line activity for a partition server migration is illustrated in FIG. 18. The collaboration server notes the current relative position of each of the partition(s) whose servers have to be migrated in function block 181. Next, the relative position(s) of the noted partition(s) are incremented in function block 182. For each partition server to be migrated, the collaboration server assigns a machine to host the migrated server in function block 183. The collaboration server then contacts the machine to build a copy of the un-migrated partition server. The collaboration server waits to hear back from each of the machines contacted that all migrated partition servers being created have the status "in formation due to migration" in function block 184. For each of the partition server(s) being migrated, the collaboration server replaces the un-migrated partition server by its migrated copy in the status structure set of the current partition servers in function block 185. Finally, in function block 186, the collaboration server sends a compound modification for migration with the un-migrated partition server (s).

History Server Migration

If a server is contained in the status structure, set of current history servers, then the collaboration server treats its migration as the migration of a history server. The first step for the collaboration server in migrating a history server is to ask the history server to let it know when the history server actually converts from a partition server to a history server. Note that the request asking for this information can reach the unconverted partition server even before the partition server has been deleted before the compound deletion modification has been picked by the partition server. Indeed the request can reach the partition server while it is "in formation" or "in formation due to migration". The partition server is required to remember this request and respond to it once it has converted to be a history server. If the request reaches a server when it has already converted to be a history server, then the request can be responded to right away. The collaboration server can cache a response for later use, avoiding unnecessary, repeated costs in history server migrations. Upon getting notified that a server is indeed a history server, the collaboration server carries out an activity on its time line of computation. The activity requires the recall of some (memorized) events on the time line that the collaboration server would have carried out prior to the activity.

The activity is as follows: in order to be able to recall later, the collaboration marks the current activity on the time line as a specific history server's migration event; the collaboration server initiates the copying of the history server on to the machine that the history server is being migrated to, and waits to hear back that the status of the new server is "being copied"; if the history server has previously been migrated as a history server, then the collaboration server informs the (un-migrated) history server of all the new clients that got added in the collaboration session since the history server's last migration event on the time line of computation; if there was no prior migration of the history server as a history server, then the list of all clients that got added since the event on the time line identifying the deletion of some partition server(s) and the creation of the history server, is sent to the history server by the collaboration server; the collaboration server next replaces the un-migrated history server by its (partially-formed) migrated copy in the status structure, set of current history servers.

After this activity, the collaboration server is free to process other activities on its time line of computation. The list of clients the un-migrated history server gets is the list of clients that have received, are receiving, or will receive history information from the history server. A history server is required to remember which clients have received history information from it. The un-migrated history server has to remain alive till all clients that are or will be receiving history information from it have actually received history information from it. Then, after ensuring that the copying of history to its migrated server copy is complete, the un-migrated history server can dismantle itself. The status of the history server that is being formed by copying from a history server under migration is "being copied". The status changes to "operational" once the copying is over. While a history server's status is "being copied", it can reply to requests asking about its status. However, for other requests such as history service, the history server is free to only log the requests and to respond only after its status changes to "operational".

Figure 19:
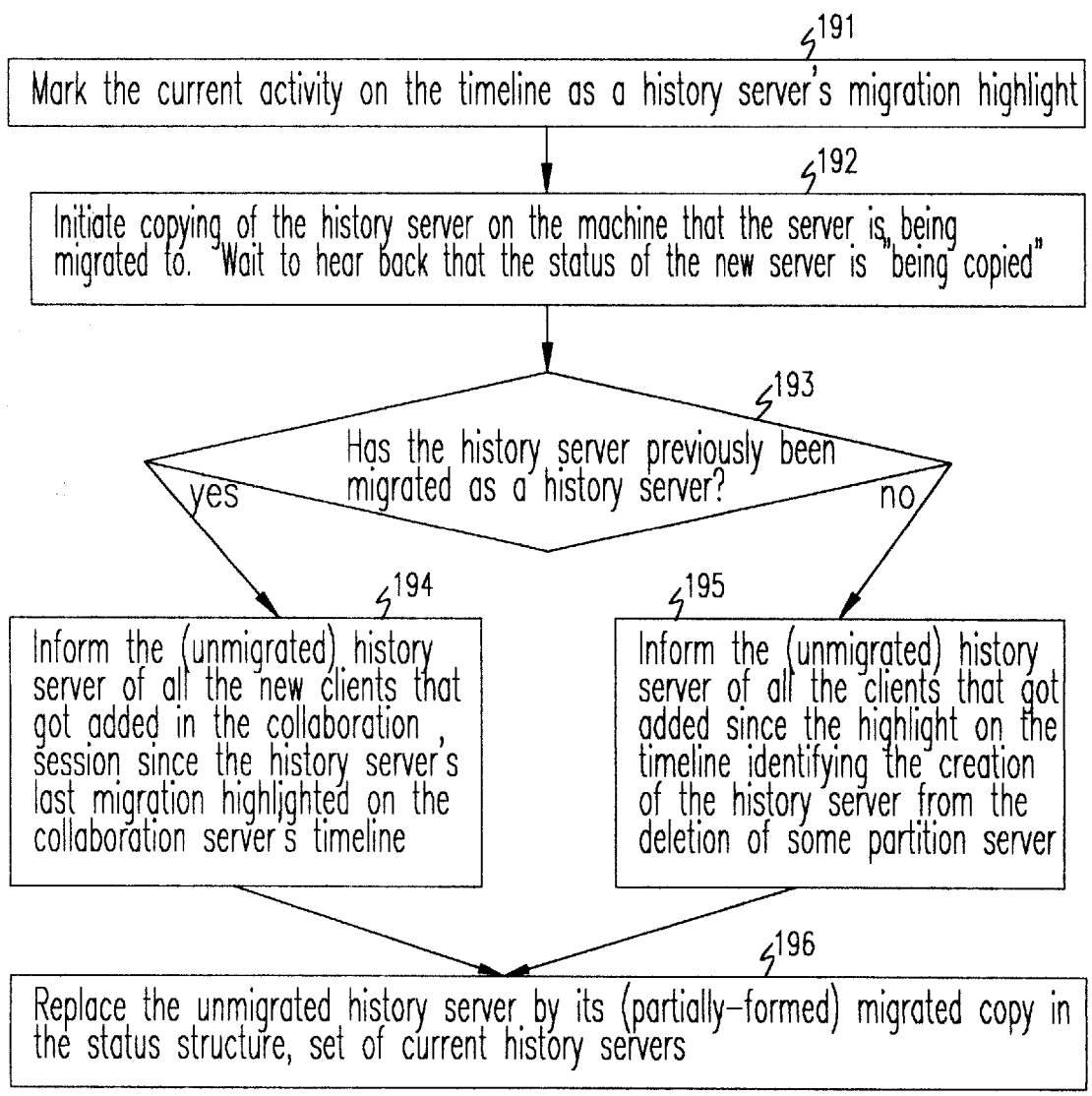
FIG. 19 is a flow diagram showing the activity carried out on the time line by the collaboration server for migrating a history server.

The time line activity for a history server migration is illustrated in FIG. 19. The collaboration server first marks the current activity on the time line as a history server's migration highlight in function block 191. Then the collaboration server initiates the copying of the history server on the machine that the server is being migrated to in function block 192. The collaboration waits to hear back that the status of the new server is "being copied". When this status is received, a test is made in decision block 193 to determine if the history server was previously migrated as a history server. If so, the (un-migrated) history sever is informed of all the new clients that got added in the collaboration session since the history server's last migration in function block 194; otherwise, the (un-migrated) history server is informed of all the clients that got added since the highlight on the time line identifying the creation of the history server from the deletion of some partition server in function block 195. Finally, the collaboration server replaces the un-migrated history server by its (partially-formed) migrated copy in the status structure set of current history servers.

Creation/Deletion Server Migration

The externally-provided, optional creation/deletion server should be compatible with the following migration procedure. In order to migrate a creation/deletion server, the collaboration server carries out the following activity on its time line of computation: the collaboration server initiates the copying of the creation/deletion server on the machine to which the server is being migrated; the collaboration server waits until it gets an acknowledgment from the machine that the status of the creation/deletion server under formation is "being copied"; upon getting the acknowledgment, the collaboration server sends to the un-migrated creation/deletion server, all clients presently contained in the status structure, set of current clients; the collaboration server then changes the status structure current location of creation/deletion server to point to the under-formation, migrated creation/deletion server.

After this activity, the collaboration server is free to process other activities on its time line of computation. The un-migrated creation/deletion server communicates with the clients it has been informed about by the collaboration server to let them know of the address of the creation/deletion server copy under formation. The clients are also informed of the status of those pending requests that will be serviced by the un-migrated server. The communication between the un-migrated server and a client ends only when the client informs the server that it is no longer needed. The server dismantles itself only after getting clearance from all clients that they no longer need it and after ensuring that the under-formation, migrated creation/deletion server has a full copy.

When a client communicates with a creation/deletion server, it can find that the creation/deletion server is in the status of "being copied" due to migration. A creation/deletion server that is in the status of "being copied" is free to log all requests except status check requests for action later when the server is fully formed. Status check requests are serviced immediately, answering queries that the server exists and is "being copied".

Figure 20:
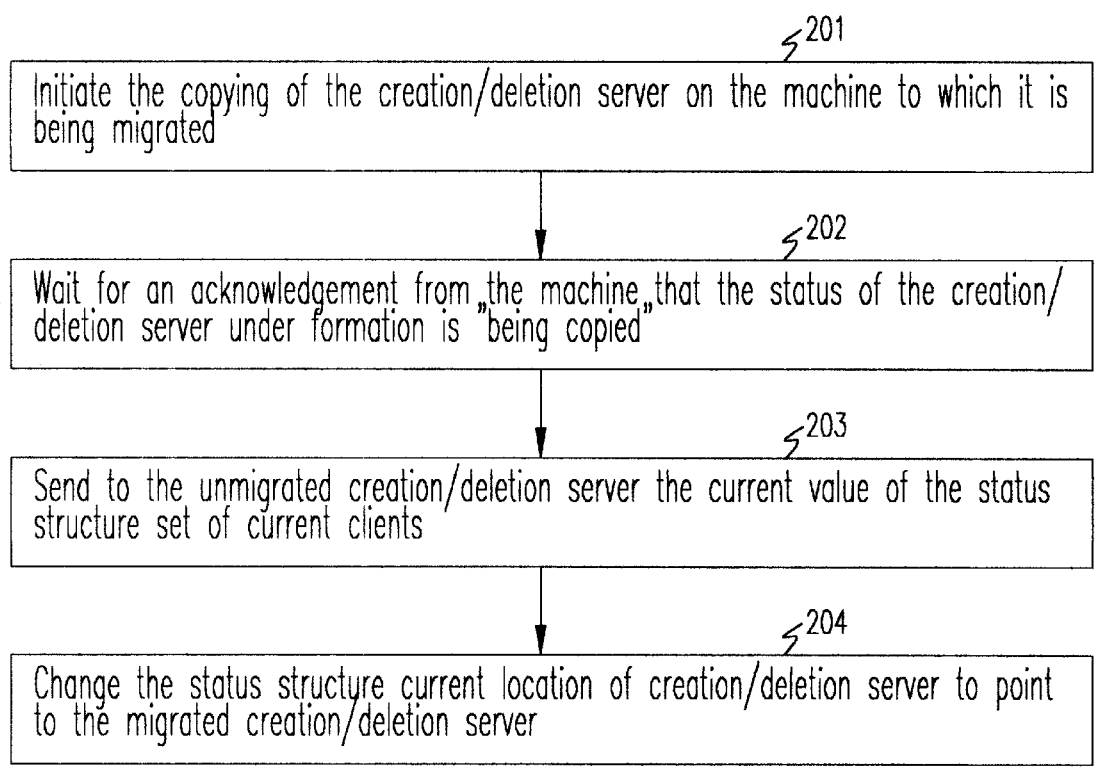
FIG. 20 is a flow diagram showing the activity carried out on the time line by the collaboration server for migrating the optional creation/deletion server.

The time line activity for a creation/deletion server migration is illustrated in FIG. 20. The collaboration server first initiates the copying of the creation/deletion server on the machine to which it is being migrated in function block 201. The collaboration server waits for an acknowledgment from the machine that the status of the creation/deletion server under formation is "being copied" in function block 202. When this acknowledgment is received, the collaboration server sends to the un-migrated creation/deletion server the current value of the status structure set of current clients in function block 203. Finally, the collaboration server changes the status structure current location of the creation/deletion server to point to the migrated creation/deletion server in function block 204.

Collaboration Server Migration

The collaboration server migrates itself by inserting the following activity on its time line of computation: it initiates the copying of itself on the machine to which it is being migrated; after it hears back from the machine that the copy being formed has a status of "being copied", it sends to all collaboration processes that are aware of it—clients, server machines' support, partition servers, etc., the address of the collaboration server copy under formation, along with the status of those pending and expected requests that will be serviced by the un-migrated collaboration server (any plans for migration of partition servers are deferred to the collaboration server being formed; thus, the list of pending and expected requests which will be serviced by the un-migrated collaboration server excludes these migrations); the communication between each collaboration process and the un-migrated server continues until the process informs the server of the conditions under which the server is no longer needed (e.g., service pending requests); the un-migrated collaboration server requires all current partition servers (taken from the status structure set of current partition servers) to replace their incoming channels from the un-migrated collaboration server by incoming channels from the collaboration server copy being formed.

After this activity, the un-migrated collaboration server remains alive to meet the conditions placed by collaboration processes for shifting away from it. After meeting the conditions, the un-migrated server ensures that its copy is consistent and fully formed. Then it dismantles itself. When a collaboration process communicates with a collaboration server, it can find that the server is in the status of "being copied" due to migration. A collaboration server that is in the status of "being copied" logs all requests except status check requests for action later when the server is fully formed. Status check requests are serviced immediately, answering queries that the server exists and is "being copied".

Figure 21:
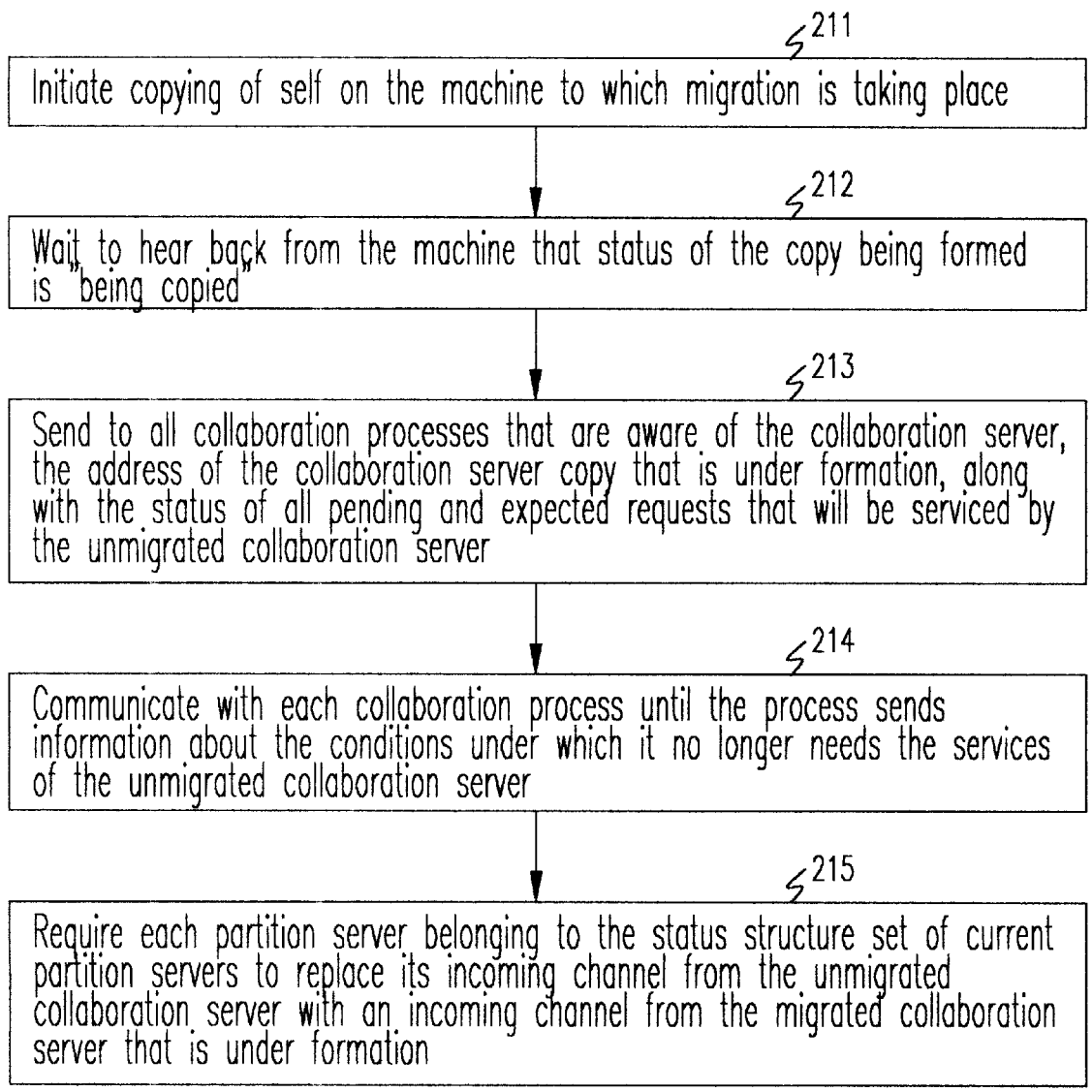
FIG. 21 is a flow diagram showing the activity carried out on the time line by the collaboration server in order to migrate itself.

The time line activity for a collaboration server migration is illustrated in FIG. 21. The collaboration server initiates copying of itself on the machine to which migration is taking place in function block 211. The collaboration server waits to hear back from the machine that status of the copy being formed is "being copied" in function block 212. When this acknowledgment is received, the collaboration server sends to all collaboration processes that are aware of the collaboration server the address of the collaboration server copy that is under formation in function block 213. Next, the collaboration server communicates with each collaboration process in function block 214 until the process sends information about the conditions under which it no longer needs the services of the un-migrated collaboration server. Finally, in function block 215, each partition server belonging to the status structure set of current partition servers is required to replace its incoming channel from the un-migrated collaboration server with an incoming channel from the migrated collaboration server that is under formation.

Remarks

As in the invention disclosed in application Ser. No. 09/241,991, every partition server in the distributed server here is required to be reasonably fair in picking unblocked modifications (e.g., modifications that have not been blocked due to relative-position sequencing) from the outputs of channels coming into the partition server. Similarly, every client is required to be reasonably fair in picking unblocked serialized modifications available at outputs of channels coming from partition servers. Reasonable fairness means that if an unblocked modification is available to be picked at some channel output, then it will eventually get picked (i.e., within finite time).

A simple way of implementing reasonable fairness is as follows. After a partition server or a client has picked a modification from a given incoming-channel output, it tries picking from all of its other incoming-channel outputs before it picks another modification from the given channel output. The partition server or client does not succeed in picking from a channel output only if the channel output is blocked, or if the channel output is empty at the time the attempt at picking is made. This scheme is reasonably fair because once a given unblocked modification becomes available at a channel output, it takes at most a finite number of modifications to be picked and processed before the given modification is picked (the number of channels is finite). Since picking and processing time of a modification is finite, the maximum time taken before the given modification is picked is finite.

Another point on the topic of fairness in the context of a distributed server comes from the fact that the distributed server is made from FIFO structures alone. There is an inherent advantage of FIFO in comparison to last in first out or LIFO since processing of new entries in LIFO can delay indefinitely the processing of old entries in LIFO (every time the turn of an old entry comes up, a new entry shows up preempting the old entry). Since the distributed server uses FIFO alone, it is never the case that processing of new modifications blocks indefinitely (and thus unfairly) the processing of older modifications.

When a client joins an ongoing collaboration, it starts from the initial workspace and re-enacts modifications that have transpired prior to its joining the collaboration. This enables the client to catch up with the synchronous state of the ongoing collaboration. The process of re-enacting modifications for each joining client separately can be sped up if the effect of several modifications is combined together in order to reduce redundancy. Combining modifications in this manner can also lead to lesser-storage and transmission costs.

Another means of reducing modification history costs is to cache the application of modifications to workspace state. In the maximal case, this can eliminate history re-enaction by a client by providing the up-to-date synchronous state of the workspace directly to the client. In a less than maximal case, caching can lead to storage of intermediate states of the workspace in order to enable a client to catch up by re-enacting modifications on more recent version of the workspace than the initial workspace. Also, the client need not acquire the initial workspace from the collaboration server. The introducing client, or some other client may provide the initial workspace directly to the joining client. The work space thus provided may not even be initial; it can be closer to the current work space than the work space at start, and thereby reduce the computation effort of the joining client in catching up with the current state.

Situations in which a client carries out compound modifications one after the other can be optimized by allowing the client to get a block of relative positions from the collaboration server for all the compound modifications at one time rather than requiring the client to communicate with the collaboration server for each individual compound modification, separately. This can be done in a manner that is similar to that described in the partition-locking mechanisms discussed previously.

While the invention has been described in terms of a single preferred embodiment with various modifications and alternatives, those skilled in the art will recognize that the invention can be practiced with modification within the spirit and scope of the appended claims.

I claim:

1. A method that supports dynamic clients, dynamic partitions, locking, and migration capability for a distributed server for real-time collaboration, the method comprising the steps of:

building an extended distributed server comprising two or more independent and independently communicating, asynchronous, distributed software processes for real-time collaboration for a session in which work space partitionings and clients can be dynamic and static;

supporting migration of processes of the extended distributed server; and supporting locking of partitions by clients for exclusive modification.

2. The method of claim 1, further comprising the step of supporting dynamic partitionings of the work space during a collaboration session.

3. The method of claim 2, wherein contents of partitions may be changed, and deletion and creation of one or more partitions can occur during a collaboration session.

4. The method of claim 1, wherein any client can leave or join a collaboration session at any time provided that the session has any one or more clients present in the session at the time.

5. The method of claim 1, wherein the extended distributed server comprises one or more partition servers which support dynamic partitioning of the work space.

6. The method of claim 5, wherein each partition server is dynamically or statically created and terminated in synchrony with the creation and deletion of its corresponding partition.

7. The method of claim 6, wherein the extended distributed server further comprises a special partition server called a display server which corresponds to a special-status null partition that is added to the dynamic partitioning of the work space.

8. The method of claim 6, wherein a terminated dynamic partition server converts into a history server for supporting newly-joined clients in synchronizing with the current state of the shared work space in an ongoing collaboration session.

9. The method of claim 8, wherein the extended distributed server further comprises history servers for providing a history of modifications so that a newly-added client can compute a current state of a shared work space.

10. The method of claim 9, wherein the history servers cache and/or synchronize intermediate modification sequences so that computation space and time are reduced.

11. The method of claim 8, further comprising the method of migrating one or more history servers.

12. The method of claim 8, wherein the extended distributed server further comprises a means of accepting an optional externally supplied process called a creation/deletion server for responding to a client's request for creation or deletion of a partition during a collaboration session.

13. The method of claim 12, wherein the extended distributed server further comprises an extended collaboration server which coordinates dynamic partitions, locking, and migration as well addition and deletion of clients during a collaboration session.

14. The method of claim 13, wherein the extended collaboration server remembers highlights of activities carried out on its time line in the order in which they were carried out.

15. The method of claim 14, wherein at any time the extended collaboration server maintains and uses status structures, which contain an approximation of an exact state of a collaboration session at the time.

16. The method of claim 15, wherein the status structures include a set of all clients that are currently participating in a collaboration session, a set of all current partition servers including their locations, a set of all current history servers including their locations, and the current location of the optional creation/deletion server, if present.

17. The method of claim 15, wherein the status structures maintained by the collaboration server either remain invariant, or are modified only by the collaboration server on the time line of the collaboration server.

18. The method of claim 12, further comprising the method of migrating a creation/deletion server.

19. The method of claim 12, further comprising the method of migrating the extended collaboration server.

20. The method of claim 5, wherein the extended distributed server comprises a channel coming into each partition server from the extended collaboration server.

21. The method of claim 5, wherein during migration, each partition server supports a temporary re-routing of channels to its migrated copy for ensuring seamless processing of modifications.

22. The method of claim 5, further comprising the method of migrating one or more partition servers.

23. The method of claim 1, further comprising a method for maintaining inter-partition synchronisation that supports general partition hierarchies and groups.

24. The method of claim 23, wherein a collaboration client can synchronously create some new work space partitions.

25. The method of claim 23, wherein a collaboration client can synchronously delete some existing work space partitions.

26. The method of claim 23, further comprising a method for a client to synchronously obtain permission for creating or deleting partitions.

27. The method of claim 26, wherein the extended distributed server further comprises a means of utilizing an optional, externally supplied creation/deletion server that provides permissions to a client for creating or deleting partitions.

28. The method of claim 1, wherein a client can join an ongoing collaboration session.

29. The method of claim 1, wherein a client can leave an ongoing collaboration session.

30. The method of claim 1, further comprising the method of locking one or more partitions of a collaboration work space.

31. The method of claim 30, further comprising the method of unlocking one or more partitions.

32. The method of claim 31, wherein the methods of locking and unlocking one or more partitions support pre-announced creation and/or deletion of one or more partitions.

33. The method of claim 1, further comprising a locking-based method of naturally splitting a partition.

34. The method of claim 1, further comprising a locking-based method of naturally merging partitions.

35. The method of claim 1, further comprising a locking-based method of naturally shifting data from partition to partition.

36. The method of claim 1, wherein the extended distributed server can have a sequential implementation.

37. The method of claim 1, wherein the extended distributed server can have a parallel implementation.

38. The method of claim 1, wherein interoperability across heterogeneous software/hardware platforms is improved by extending the functionality of distributed server-based real-time collaboration by dynamic partitions and dynamic clients.

39. The method of claim 38, wherein interoperability across heterogeneous software/hardware platforms is further improved by removing a need for special support by allowing the distributed server processes to migrate and dynamically adapt to changing network and collaboration conditions such as faults, transients, load relief, and balanced/unbalanced development of network load, including conditions at client machines.

\* \* \* \* \*